US006782202B2

(12) United States Patent
Arita et al.

(10) Patent No.: US 6,782,202 B2
(45) Date of Patent: Aug. 24, 2004

(54) OPTICAL COMMUNICATION METHOD, OPTICAL LINKING DEVICE AND OPTICAL COMMUNICATION SYSTEM

(75) Inventors: Hiroshi Arita, Hitachi (JP); Tetsuaki Nakamikawa, Hitachi (JP); Kenichi Kurosawa, Hitachi (JP); Hiroaki Fukumaru, Hitachi (JP); Hisao Ogawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 191 days.

(21) Appl. No.: 09/865,584

(22) Filed: May 29, 2001

(65) Prior Publication Data

US 2001/0028487 A1 Oct. 11, 2001

Related U.S. Application Data

(62) Division of application No. 09/115,763, filed on Jul. 15, 1998, now Pat. No. 6,249,363.

(30) Foreign Application Priority Data

Jul. 23, 1997 (JP) ............................................. 9-196754
Jul. 23, 1997 (JP) ............................................. 9-196992

(51) Int. Cl.[7] .............................................. H04B 10/20
(52) U.S. Cl. ......................................... 398/60; 398/73
(58) Field of Search ......................... 359/118; 710/128, 710/100, 105, 106, 126, 306, 309; 398/60, 73, 137, 59

(56) References Cited

U.S. PATENT DOCUMENTS 5,535,340 A * 7/1996 Bell et al. ................... 710/112
5,581,709 A * 12/1996 Ito et al. ....................... 710/38
5,696,911 A * 12/1997 Fredriksson ................. 710/106
5,761,454 A * 6/1998 Adusumilli et al. ........ 710/311
5,764,933 A * 6/1998 Richardson et al. ........ 710/312

FOREIGN PATENT DOCUMENTS

JP 6-235333 8/1994

* cited by examiner

Primary Examiner—Jason Chan
Assistant Examiner—Christina Y Leung
(74) Attorney, Agent, or Firm—Kenyon & Kenyon

(57) ABSTRACT

The system includes optical bus-bridging devices for observing the modes of said electric buses and the modes of said optical fibers while said electric buses have not been driven (OFF mode), so that the modes of the two electric buses connected through optical fibers are brought into agreement and that the buses can be simultaneously driven by a plurality of nodes. While one or both of said electric buses have been driven (ON mode) by the nodes connected thereto, an optical output has been continuously produced from the buses that are being driven to said optical fibers, and while light has been inputted from said optical fibers, the modes of said buses are not observed, but an electric output is produced to the electric bus of the side to which light is inputted to drive the bus. The optical bus-bridging device changes the mode of the electric bus when the optical fiber does not change within a predetermined period of time after the optical bus-bridging device has outputted a signal to the optical fiber.

5 Claims, 25 Drawing Sheets

| INPUT | OUTPUT | | REMARKS |
|---|---|---|---|
| TxD_N (134) | BUSH (31) | BUSL (32) | BUS STATE |
| ON (0) | Vonh | Vonl | ON |
| OFF (1) | Voff | Voff | OFF |

| INPUT | OUTPUT | REMARKS |
|---|---|---|
| BUSH-BUSL | RxD_N (131) | BUS STATE |
| Vof≧Vth | ON (0) | ON |
| Vof<Vth | OFF (1) | OFF |

| INPUT | OUTPUT |
|---|---|
| OIN (1311) | DOUT (132) |
| OFF | OFF (0) |
| ON | ON (1) |

| INPUT | OUTPUT |
|---|---|
| DIN (133) | OOUT (1312) |
| OFF (0) | OFF |
| ON (1) | ON |

FIG. 10

| INPUT | OUTPUT | |
|---|---|---|
| 4021 | 4022 | CNT_UP 143 |
| 0000 | 1111 | 1 |
| 0001 | 0000 | 0 |
| 0010 | 0001 | 0 |
| 0011 | 0010 | 0 |
| 0100 | 0011 | 0 |
| 0101 | 0100 | 0 |
| 0110 | 0101 | 0 |
| 0111 | 0110 | 0 |
| 1000 | 0111 | 0 |
| 1001 | 1000 | 0 |
| 1010 | 1001 | 0 |
| 1011 | 1010 | 0 |
| 1100 | 1011 | 0 |
| 1101 | 1100 | 0 |
| 1110 | 1101 | 0 |
| 1111 | 1110 | 0 |

WHEN MODE (151)=1

| MODE | DIN (133) | TxD N (134) | CNT ENB (144) |
|---|---|---|---|
| Q0 | OFF | OFF | OFF |
| Q1 | OFF | ON | OFF |
| Q2 | ON | OFF | OFF |
| Q3 | OFF | OFF | ON |

WHEN MODE (151)=0

| MODE | DIN* (132) | TxD N (134) | CNT ENB (144) |
|---|---|---|---|
| Q0 | OFF | OFF | OFF |
| Q1 | OFF | ON | OFF |
| Q2 | ON | OFF | OFF |
| Q3 | OFF | OFF | ON |

SP···SAMPLING POINT

FIG. 25

| INPUT SIGNALS | | | | OUTPUT SIGNALS |
|---|---|---|---|---|
| CARRY 2121 | RDS 21111 | DOUTS 21112(t-1) | DOUTS 21112(t) | S |
| × | 0 | 0 | 0 | 0 |
| × | 0 | 0 | 1 | 0 |
| × | 0 | 1 | 0 | 0 |
| × | 0 | 1 | 1 | 0 |
| × | 1 | 0 | 0 | 0 |
| × | 1 | 0 | 1 | 1 |
| × | 1 | 1 | 0 | 0 |
| × | 1 | 1 | 1 | 0 |
| 0 | 0 | × | × | 0 |
| 0 | 1 | × | × | 0 |
| 1 | 0 | × | × | 0 |
| 1 | 1 | × | × | 1 |

FIG. 26

| INPUT SIGNALS | | | INTERNAL STATE | | OUTPUT SIGNALS | |
|---|---|---|---|---|---|---|
| CK 2141 | RESET 2115 | PRESET 2132 | COUNT (t−1) | COUNT (t) | CARRY 2111 | REMARKS |
| ⌐⌙ | 1 | j | x | j | 0 | j≠63 |
| ⌐⌙ | 0 | x | j | j+1 | 0 | J+1≠63 |
| ⌐⌙ | 0 | x | j | j+1 | 1 | J+1=63 |

# OPTICAL COMMUNICATION METHOD, OPTICAL LINKING DEVICE AND OPTICAL COMMUNICATION SYSTEM

This is a division of application Ser. No. 09/115,763 filed Jul. 15, 1998 now U.S. Pat. No. 6,249,363.

BACKGROUND OF THE INVENTION

Field of the Invention

The present invention relates to an optical communication system and, particularly, to a system for bringing the states of buses into agreement when the two electric buses in a network are connected together through optical fibers.

A field LAN for industrial use is installed on a field and is subject to be affected by electromagnetic noise from power cables and by lightning. If an optical fiber which is a noise-resistant transmission medium is used instead of an electric cable, therefore, it becomes possible to bury the power line and the control LAN in the same channel. Generally, however, the optical transmission devices are more expensive than the electric transmission equipment. When the whole apparatus is connected by using optical fibers, therefore, the system cost is driven up. On the other hand, the optical transmission equipment is used only in limited places in the system. Therefore, if the places where expensive optical transmission devices are used are limited, then, the cost of the system can be suppressed.

To meet this demand, Hitachi, Ltd. has put into practical use an optical linking device (LWZ440) for a program controller (S10/2 α) in which the electric buses are partly replaced by optical fibers, and both ends of the optical fibers are connected to the electric buses via photo-electric conversion devices.

In a system using the controller S10/2 α and the device LWZ440, the master of the control LAN is limited to only one controller and, hence, a signal that flows into the control LAN is either from master to slave or from slave to master. Therefore, the optical linking device LWZ440 changes over the direction of transmission in a unit of a packet transfer to realize the transmission of data between the master and the slave.

A conventional control system, in which the electric buses are partly replaced by optical fibers, is constituted by a master that outputs an instruction to the control LAN and a plurality of slaves that operate upon receiving the instruction. This is because, when there exist many masters, the control LAN itself must have an arbitration function to simultaneously output control data (instructions) to the control LAN, and it becomes difficult to exchange the data in a predetermined period in real time.

However, when the master is a controller, even a manual operation cannot be accomplished from the operation board in case the controller becomes defective. Therefore, an instruction system had to be separately provided to halt the whole system in case of emergency.

To solve this problem, a multi-master system is required enabling a plurality of nodes connected to the control LAN to become masters. An ISO11898 standard is one of the transfer systems that corresponds to the multi-master system.

According to the transfer system of the ISO11898 standard as disclosed in Japanese Patent Laid-Open No. 236333/1994, a plurality of nodes are connected using serial lines of the form of buses, enabling the data to be simultaneously outputted to the LAN from a plurality of nodes. According to this standard, furthermore, the data are transferred as every node outputs data to the serial line and detects the state of the bus repetitively for every bit. Moreover, each node drives the bus at the time when a logic 0 is outputted to the serial line but does not drive the bus when a logic 1 is outputted, in order to transfer the data bit by bit. Thus, even with one node, the bus assumes the state of logic 0 when the logic 0 is outputted.

Therefore, every node detects the state of the bus after the data is outputted. At this moment, the value outputted to the bus is compared with the state of the bus and when they are not in agreement, the node no more outputs the data. Thus, the nodes successively interrupt the transmission of packet, thereby executing the arbitration.

In a system based on the ISO11898 standard, unlike the conventional system of a single master, the states of all buses must be brought into agreement while a bit is being transferred. In a system which changes over the direction of transmission using optical fibers in a unit of a packet as in the above-mentioned optical linking device (LWZ440), therefore, it is not allowed to bring the states of electric buses at both ends of the optical fiber into agreement.

It is therefore presumed that the state of one electric bus is transmitted to the driven state, a logic 0 state, the driven state outputted by a logic 0 of another electric bus via an optical fiber. Optical bus-bridging devices attached to both ends of the optical fiber observe the states of the electric buses to which they are connected, produce an optical output upon confirming that the electric bus is being driven, and transmit it to the other optical bus-bridging device via the optical fiber. Upon detecting an optical input from the optical fiber, the other bus-bridging device drives the electric bus. Thus, the drive state of the one electric bus is transmitted to the other electric bus via the optical fiber.

However, when the transmission of the state of the bus and the response are executed in two directions in the optical linking devices by using two optical fibers to realize a multi-master system, there may often be formed an optical loop by the two optical linking devices and the optical fibers, resulting in the occurrence of a "deadlocked situation" or a "crossing situation" as described below, making it difficult to properly bring the states into agreement.

FIG. 17 illustrates a problem stemming from the optical linking devices of two directions. In this system, a node 1 and a node 2 drive the electric buses a and b to which they are connected. Optical linking devices a and b are connected to both ends of the optical fibers, the optical linking device a being connected to the bus a and the optical linking device b being connected to the bus b. The optical linking devices a and b output light to the optical fibers when the electric buses to which they are connected are driven. Conversely, when light is inputted from the optical fibers, the optical linking devices a and b drive the electric buses to which they are connected.

(1) It is now presumed that none of the two electric buses a and b have been driven in the initial state. In this case, none of the buses a and b are driven, and none of the optical linking devices a and b are producing optical output to the optical fiber, maintaining a stable state.

(2) In this state, the node 1 connected to the bus a drives the bus a.

(3) Upon detecting the fact that the bus a is driven, the optical linking device a produces an optical output to the optical fiber. Upon receiving this optical output, the optical linking device b starts driving the bus b.

(4) The bus b is driven by the optical linking device b, and the node 2 detects the fact that the bus b is being driven.

Since the bus b is in a state in which it is being driven, the optical linking device b produces optical output to the optical fiber. Accordingly, the optical linking device a starts driving the bus a.

(5) Next, the node 1 no longer drives the bus a. However, since the optical linking device a continues to drive the bus a, the bus a is maintained driven. Both, the bus a and the bus b remain stable in a state of being driven. Thus, a large latch loop is formed by the two optical fibers and two optical linking devices. Finally, therefore, the buses a and b remain stable in a state of being driven despite their being driven by none of the nodes, resulting in the occurrence of a so-called "deadlocked situation".

Moreover, when the two electric buses a and b are driven to assume the ON state during a transfer cycle, the optical linking devices a and b, respectively, judge that the buses of their own sides are turned ON and work to produce optical outputs to the optical fibers in an effort to turn the buses of the other sides ON, establishing a "crossing situation". In the "crossing situation", the bus drive signals of the optical linking devices a and b are exchanged between the two buses; i.e., the buses a and b vibrate in repeating ON/OFF state.

SUMMARY OF THE INVENTION

The object of the present invention is to provide an optical communication method, optical linking devices and an optical communication system which are free from the above-mentioned problems inherent in the prior art, and are capable of bringing into proper agreement the driven states of the two electric buses connected together through optical fibers, and in which a plurality of nodes are allowed to simultaneously drive the buses.

The present invention is further concerned with a bus system in which two electric buses are linked together through optical fibers, wherein a mode of producing an optical output to the optical fiber is separated from a mode of producing an electric output to the electric bus, in order to prevent the formation of the above-mentioned optical loop.

The above-mentioned object is accomplished by an optical communication method in which the states of the two electric buses connected through optical fibers are brought into agreement, wherein:

the states of said electric buses and the states of said optical fibers are observed while said electric buses are not being driven (OFF state);

while one or both of said electric buses are being driven (ON state) by the nodes connected thereto, an optical output is continuously produced from the buses that are being driven to said optical fibers;

while light has been inputted from said optical fibers, the states of said buses are not observed, but an electric output is produced to the electric bus of the side to which light is inputted to drive the bus; and when the buses are no longer driven by said nodes, said optical outputs and said electric outputs are halted, and said electric buses are no longer driven.

This makes it possible to reliably avoid the above-mentioned deadlocked situation.

Furthermore, at the time of being shifted to the non-driven mode by no longer producing the electric output, a state is passed through in which said electric buses are not observed for only a predetermined period of time. Therefore, even when the optical bus-bridging devices are no longer driving the electric buses, a transient ON state is not erroneously regarded the bus as driven despite the state of the electric bus has transiently changed from ON state to OFF state, and erroneous operation is avoided. The above-mentioned predetermined period is longer than a transient period. This transient period is determined by the characteristics of the means for driving the buses, and can be set irrespective of the transfer distance inclusive of optical fibers and electric buses or the data transfer rate.

When both of said electric buses are driven by the respective nodes and when optical outputs are sent to said optical fibers from both sides, one side discontinues the production of said optical output and produces said electric output only. This eliminates the above-mentioned "crossing situation".

The invention further deals with optical linking devices (optical bus-bridging devices) for realizing the optical communication method of the present invention, installed among the optical fibers for connecting the two electric buses and said electric buses in order to bring the states of the two electric buses into agreement, comprising a means which executes a standby mode for observing the states of the buses and the states of the optical fibers when said electric buses are not being driven (OFF state), an optical output mode shifted from said standby mode when said electric buses are driven (ON state) by the nodes to which they are connected, in order to produce an optical output to said optical fibers, a bus drive mode for producing an electric output to the electric bus of its own side when an optical input is received from said optical fibers, and a non-observation mode which, when the buses are no longer driven by said nodes, inhibits the observation of the states of the buses for a predetermined period of time at the time when said bus drive mode is shifted to said standby mode, wherein said means changes over these modes depending upon the states of the buses.

Provision is further made of a mode shift signal-setting means for shifting one of the two optical bus-bridging devices into the bus drive mode when the two electric buses are driven by the nodes and when the two optical bus-bridging devices provided on both sides of said optical fibers are simultaneously changed over to said optical output mode.

The invention is further concerned with an optical communication system to which the optical linking devices of the invention are adapted, comprising electric buses having two electrical states, a plurality of nodes for outputting two-value data to said electric buses, optical linking devices having means for converting electric signals into optical signals and means for converting optical signals into electric signals, and an optical fiber for connecting said two electric buses together via said optical linking devices, wherein:

said optical fiber includes two optical fibers through which said optical linking devices execute optical output and optical input separately in order to transmit the states of said electric buses in two directions;

said optical linking devices have a function for observing the ON/OFF state of said electric buses and the presence/absence of optical input from said optical fibers, for producing optical outputs to said optical fibers when said electric bus is because optical linking devices are connected only one electric bus in the ON state, and for producing an electric output to the electric bus of its own side when an optical input is received from said optical fibers, and a function for halting the optical output of one side and for producing said electric output only when said two optical fibers have simultaneously produced said optical outputs giving rise to the occurrence of an optical loop situation; and when said electric buses are driven for each of the transmission cycles depending upon the ON/OFF of a bit data from said node, the driven states of the two electric buses are brought into agreement via said optical fibers and said optical linking devices on both sides thereof, and after the states have been brought into agreement, said nodes execute the sampling of said electric buses.

When said data are simultaneously outputted from said plurality of nodes to said electric buses, the states of said buses are necessarily determined to be a preferential state, and every node compares the state in which it has produced an output to said electric bus with the state of said electric bus and determines whether the data be continuously outputted to said electric bus or not.

FIG. 18 illustrates the steps for bringing the driven states of the electric buses into agreement according to the present invention.

(1) It is first presumed that none of the two electric buses a and b have been driven in the initial state. In this case, the optical bus-bridging devices a and b are both in the standby mode.

(2) Next, a node 1 connected to the bus a drives the bus a.

(3) The optical bus-bridging device a detects the fact that the bus a is driven, shifts the mode from the standby mode into the optical output mode, and produces an optical output to the optical fiber. Upon receiving the optical output, the optical bus-bridging device b shifts the mode from the standby mode to the bus drive mode and starts driving the bus b. In the bus drive mode, no bus is observed.

(4) As a result, the bus b is driven, and the states of the two buses a and b are brought into agreement. The node 2 fetches the driven state of the bus b, and the transmission of a bit from the node 1 to the node 2 ends.

(5) Next, the node 1 no longer drives the bus a. Thus, the optical bus-bridging device a is shifted from the optical output mode to the standby mode and no longer produces optical output to the optical fibers. In response to this, the optical bus-bridging device b is shifted from the bus drive mode to the standby mode.

Thus, one of the optical bus-bridging devices is shifted to the optical output mode and the other one is shifted to the bus drive mode to avoid the occurrence of the deadlocked situation caused by the formation of an optical loop.

In (5) above, a non-observation mode of a predetermined period of time is passed through when the optical bus-bridging device b is shifted from the bus drive mode to the standby mode. This prevents the optical bus-bridging devices from being erroneously operated.

When the two optical bus-bridging devices simultaneously assume the optical output mode, furthermore, the device of the side in which a mode transition signal (MODE) has been set in advance changes the optical output mode over to the bus drive mode.

In practice, a bus is driven by a node in compliance with the ISO11898 standard for every period for transferring a bit. Therefore, the two optical bus-bridging devices need not simultaneously share the optical output mode but only one of them may have the optical output mode.

In order to accomplish the above-mentioned object, furthermore, the present invention deals with a data processing system comprising:

a first bus transferring voltage;

a second bus transferring voltage;

a plurality of computers connected to said first bus or said second bus, detect the state of the bus to determine whether the transmission can be effected or not, and transmit and receive messages; and a first bus-bridging device connected between said first bus and a third bus in order to connect said first bus to said second bus through said the third bus using light, and a second bus-bridging device connected between said second bus and said third bus;

wherein said first and second bus-bridging devices have a function for detecting whether a signal input from the third bus is the signal output from the first and the second bus-bridging devices themselves or not.

In order to accomplish the above-mentioned object, furthermore, the present invention comprises:

a bus driver circuit connected to a first bus that uses transfers voltage and exchanges the signals relative to said first bus;

a conversion circuit connected to a second bus using transferring light and outputs optical signals to said first bus; and a state-of-the-bus judging circuit which receives a signal representing the state of said first bus sent from said bus driver circuit and a signal representing the state of said second bus sent from said conversion circuit, determines the state of said first bus based upon a change in the signal representing the state of said first bus and upon a change in the state of said second bus, and sends an output to said bus driver.

BRIEF DESCRIPTION OF THE DRAWINGS

FIG. 6 is a diagram illustrating the operation specifications of a photo-electro converter and an electro-photo converter;

FIG. 10 is a diagram illustrating the operation of a decrementer;

FIG. 25 is a diagram illustrating the operation of a set condition circuit;

FIG. 26 is a diagram illustrating the operation of a time counter circuit;

DESCRIPTION OF THE PREFERRED EMBODIMENTS

Embodiments of the present invention will now be described in detail with reference to the drawings.

Figure 1:
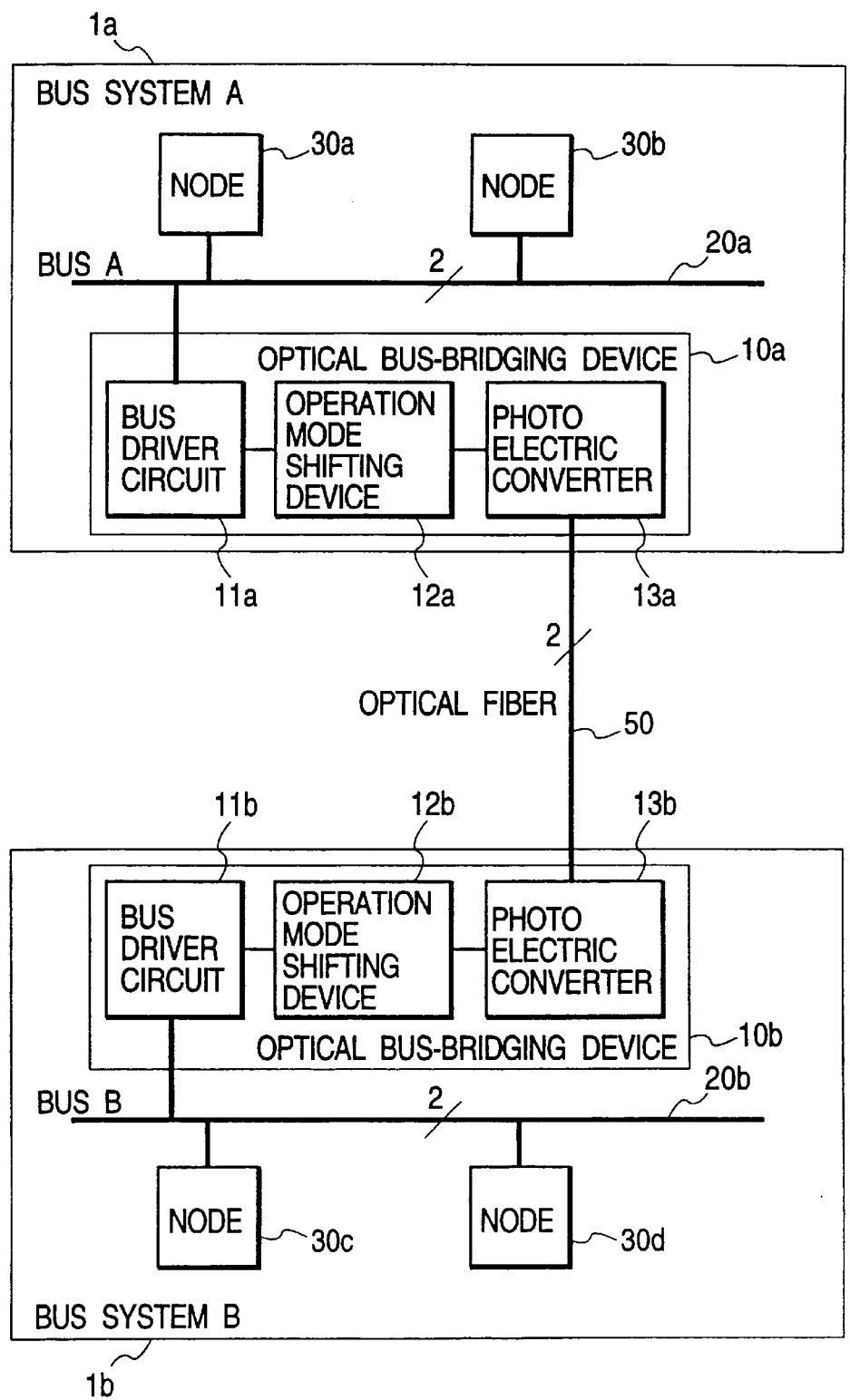
FIG. 1 is a diagram illustrating the constitution of an optical communication system according to an embodiment of the present invention.

FIG. 1 illustrates the constitution of an optical communication system according to an embodiment of the present invention. Two electric buses A and B to which nodes 30 are connected are connected together through optical bus-bridging devices 10a, 10b and an optical fiber 50, thereby to constitute a network. As will be described later, the optical bus-bridging device 10 constitutes a nucleus portion of the present invention.

A bus system A 1a is constituted by the optical bus-bridging device 10a and nodes 30a, 30b that are electrically connected to an electric bus A 20a (hereinafter referred to as bus 20a). Similarly, a bus system B 1b is constituted by the optical bus-bridging device 10b and nodes 30c, 30d that are electrically connected to an electric bus B 20b (hereinafter referred to as bus 20b). The optical fiber 50 is constituted by two optical fibers, i.e., an optical fiber which transmits an optical output of the optical bus-bridging device 10a to the optical bus-bridging device 10b and an optical fiber which transmits an optical output of the optical bus-bridging device 10b to the optical bus-bridging device 10a.

Every node 30 repeats the transfer of data of a bit to the bus and the detection of the state of the bus, which is called transfer cycle, according to the protocol specified under the ISO11898. Therefore, the output of a given node 30 must have been fed to every node 30 prior to the sampling point SP for detecting the state of the bus at the end of the transfer cycle.

In order to realize this, the optical bus-bridging device 10 suitably changes over a standby mode for detecting the state of the bus, an optical output mode for transferring the driven state of the bus of its own side to the opposing side, a bus drive mode for driving the bus of its own side depending upon the optical input, and a non-observation mode for inhibiting the observation of the state of the bus for a predetermined period of time when the bus drive mode is shifted to the standby mode, during the transfer cycle in order to bring the states of the buses 10a and 10b into proper agreement.

Described below is the operation of the system starting from the standby mode in which neither the bus 20a nor the bus 20b is driven through the situation in which the bus 20a is driven, the situation in which the bus 20a is no longer driven in the next transfer cycle up to the standby mode of the next time.

As the node 30a or the node 30b drives the bus 20a, the optical bus-bridging device 10a is changed over to the optical output mode for transmitting the driven state of the bus 20a to the system B of the opposing side, and sends an optical output which is a request for drive to the optical fiber 50. Upon receipt of the request for drive from the system A through the optical fiber 50, on the other hand, the optical bus-bridging device 10b is changed over to the bus drive mode for transmitting the state of the bus 20a to the bus of its own side, and starts driving the bus 20b. As a result, the bus 20a and the bus 20b are put in the state in which they are driven in agreement with each other. Furthermore, the nodes 30c and 30d detect the fact that the bus 20b is in the state of being driven. That is, the data (ON) of a bit is transferred from the system A to the system B.

When the bus 20a is no longer driven in the next transfer cycle, the optical bus-bridging device 10a is changed over to the standby mode, and no optical output is sent to the optical fiber 50. Since there is no request for driving the bus from the system A, the optical bus-bridging device 10b no longer drives the bus 20b. At this moment, if the optical bus-bridging device 10b is readily changed over to the standby mode from the bus drive mode to observe the bus 20b which is still in an electrically transient period after being driven by the optical bus-bridging device 10b, then, the optical bus-bridging device 10b may erroneously judge that the bus 20b is being driven and erroneously produces an optical output.

Prior to being shifted to the standby mode, therefore, the optical bus-bridging device 10b is shifted to the non-observation mode in which it is inhibited to observe the bus 20b for a predetermined period of time. After the passage of a predetermined period of time, the bus 20b stably assumes the OFF state from the ON state. Then, the optical bus-bridging device 10b is shifted to the standby mode to observe the bus 20b again. As a result, neither the bus 20a nor the bus 20b is driven.

When the observation is resumed after the passage of a predetermined period of time to detect that the bus 20b is in a state of being driven, it is then confirmed that the node 30c or the node 30d connected to the bus 20b has worked. Then, the optical bus-bridging device 10b is shifted to the optical output mode to start sending optical output to the optical fiber 50. Upon receipt of the optical output, the optical bus-bridging device 10a drives the bus 20a.

Figure 2:
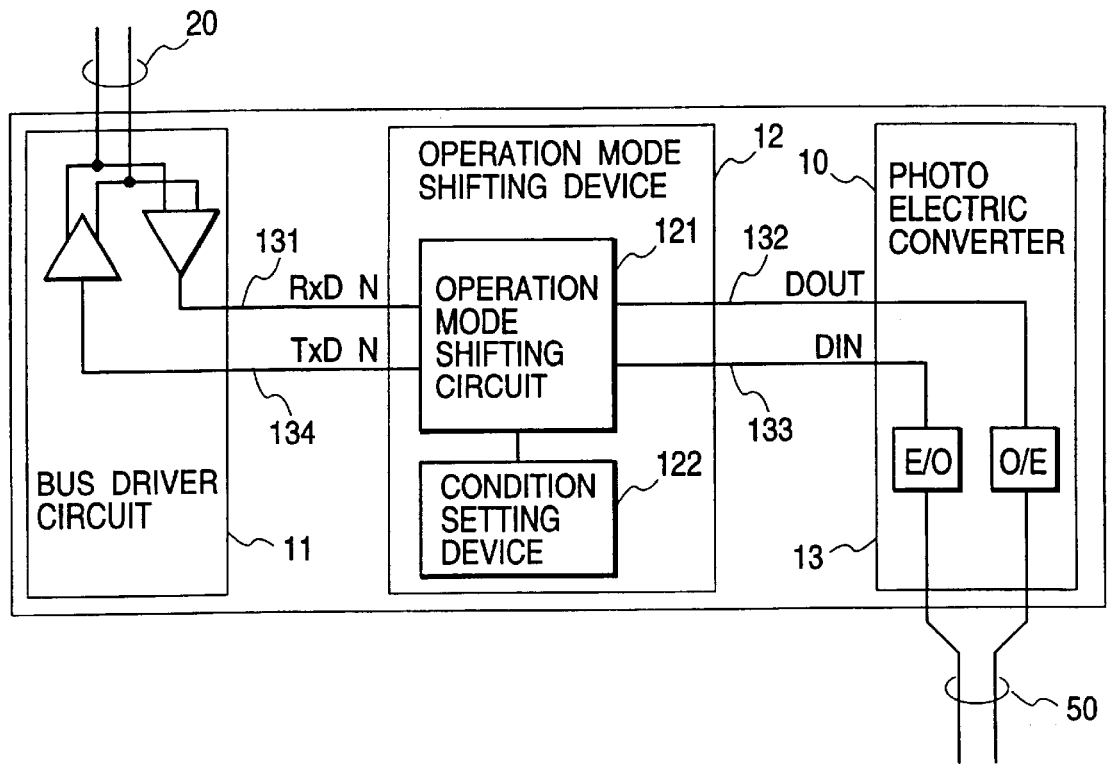
FIG. 2 is a diagram illustrating the constitution of an optical bus-bridging device.

FIG. 2 illustrates the constitution of the optical bus-bridging device. The optical bus-bridging device 10 has the same constitution in either the system A or the system B and is, hereinafter, described without distinction of the system. As required, furthermore, a sign of the signal line is attached in parenthesis to the end of the name of the signal.

The optical bus-bridging device 10 is constituted by a bus driver circuit 11 for driving and detecting the state of the bus 20, a photo-electric converter 13 which converts an electric signal into light to output it into the optical fiber 50 and converts an optical input from the optical fiber 50 into an electric signal, and an operation mode shifting device 12.

The bus driver circuit 11 and the operation mode shifting device 12 are connected together through a signal line 131 of a signal RxD_N and a signal line 134 of a signal TxD_N, and the operation mode shifting device 12 and the optical converter 13 are connected together through a signal line 132 of DOUT and a signal line 133 of DIN.

Figure 3:
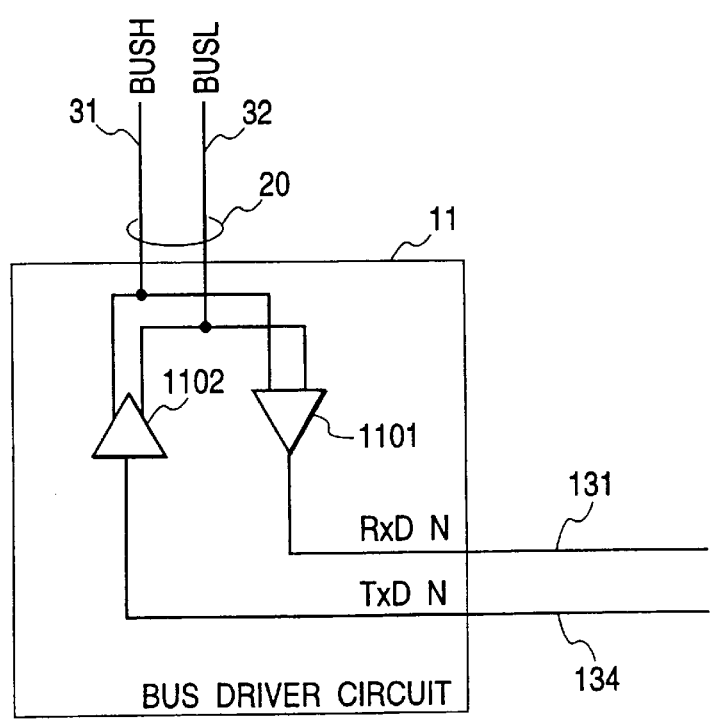
FIG. 3 is a diagram illustrating the constitution of a bus driver circuit.

FIG. 3 is a diagram schematically illustrating the bus driver circuit. The bus driver circuit 11 is constituted by a receiver 1101 for detecting the state of the bus 20 and a transmitter 1102 for driving the bus 20. The bus 20 comprises two signal lines 31 and 32 for transmitting signals BUSH and BUSL. The signals BUSH (31) and BUSL (32) are outputs of the transmitter 1102 and inputs to the receiver 1101.

Figures 4A, 4B, 4C:
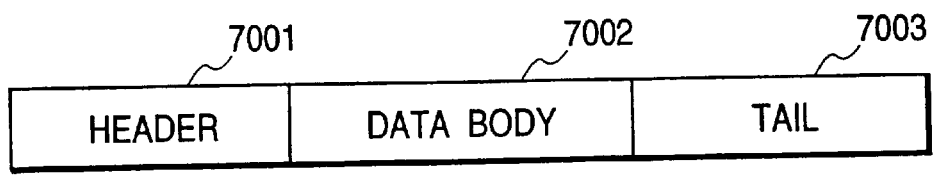
FIG. 4 is a diagram illustrating the operation specifications of a transmitter and a receiver, and a packet structure (ISO11898 standard)

FIG. 4 illustrates the operations of the transmitter and the receiver, and the constitution of a packet. FIG. 4(a) illustrates the operation of the transmitter 1102. When a value of the input signal TxD_N (134) is ON (0), the signals BUSH (31) and BUSL (32) change into predetermined voltages Vonh and Vonl, and the bus 20 assumes the ON state. When the value of TxD_N is OFF (1), on the other hand, the transmitter 1102 does not drive the bus 20, the signals BUSH and BUSL both assume a predetermined voltage Voff, and the bus 20 assumes the OFF state.

FIG. 4(b) illustrates the operation of the receiver 1101. When a potential difference Vdf between BUS H (31) and BUSL (32) is greater than a threshold value Vth, the receiver 1101 judges the bus 20 to be in the ON state, and turns the signal RxD_N of the signal line 131 ON (0). When the potential difference Vdf is smaller than the threshold value Vth, on the other hand, the receiver 1101 judges the bus 20 to be in the OFF state and turns the signal RxD_N (131) OFF (1).

In the bus driver circuit 11, the inputs of the transmitter 1102 and the receiver 1101 are connected together via BUSH (31) and BUSL (32). Therefore, when the input TxD_N (134) of the transmitter 1102 is turned ON, the potential difference Vdf between BUSH (31) and BUSL (32) exceeds the threshold value Vth, and the output RxD_N (131) of the receiver 1101 is turned ON. The time until the bus 20 assumes the OFF state after the bus 20 is no longer driven to remain in its ON state by the bus driver circuit 11, is determined by the characteristics of the bus driver circuit 11. Therefore, the period of the non-observation mode is determined by the characteristics of the bus driver circuit 11 only irrespective of the transfer distance (lengths of optical fiber 50 and bus 20) or the data transfer rate.

It is now presumed that Voff=2.5 (v) and Vth=0.8 (v) when Vonh=3.5 (v) and Vonl=1.5 (v). When the transmitter 1102 drives the bus to assume the ON state, the potential difference Vdf between BUSH and BUSL is Vonh−Vonl=2.0 (v). Since Vdf≧Vth, the receiver 1101 detects the ON state of the bus 20. When the transmitter 1102 does not work and the bus 20 is in the OFF state, the potential difference Vdf between BUSH and BUSL is 0 (v) and Vdf<Vth. Therefore, the receiver 1101 detects the OFF state of the bus 20.

The plurality of nodes 30 connected to the bus 20 are equipped with a bus driver circuit (not shown) same as the bus driver circuit 11. The bus driver circuits in the nodes 30 are capable of driving the bus 20 simultaneously. When there is at least one node 30 capable of driving the bus 20 to assume the ON state, there develops a potential difference between BUSH (31) and BUSL (32), and the bus assumes the ON state. In this case, other nodes 30 that did not drive the bus 20 in an attempt to maintain the bus 20 in the OFF state, detect the ON state of the bus 20.

In view of this feature, the packet stipulated under the ISO11898 standard has been constituted by a header 7001, a data body 7002 and a tail 7003 as shown in FIG. 4(c). The node 30 compares its own output with the state of the bus for every bit while the header 7001 is being transferred. When the states are not in agreement, the node 30 executes the arbitration processing to no longer transfer the packet. Therefore, in a step of entering into the transfer of the data body 7002, only one node is transferring data to the bus.

Figures 5, 6A, 6B:
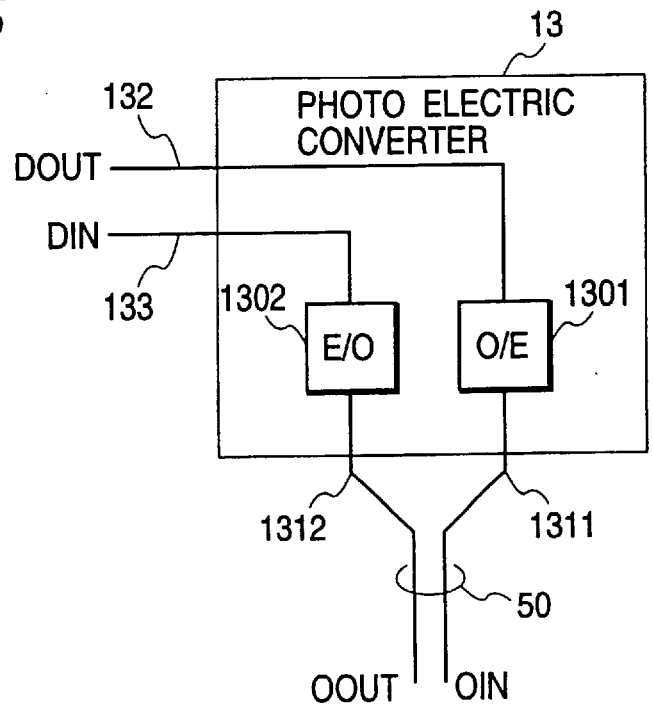
FIG. 5 is a diagram illustrating the constitution of a photo-electric converter.

FIG. 5 is a diagram schematically illustrating the photo-electric converter. The photo-electric converter 13 is constituted by a photo-electric conversion unit O/E 1301 for converting light into electricity and an electric-photo conversion unit E/O 1302 for converting electricity into light. In FIG. 5, DIN (133) denotes an electric control signal for turning an optical output ON and OFF, and DOUT (132) denotes a control signal for turning the input TxD_N (134) of the transmitter 1102 ON and OFF.

FIG. 6 is a diagram illustrating the operation of the photo-electric converter. The photo-electric conversion unit O/E 1301 operates as illustrated in FIG. 6(a). That is, the electric output DOUT (132) is turned OFF (0) when there is no optical input from the optical fiber 50, i.e., when OIN (1311) is OFF, and is turned ON (1) when OIN (1311) is ON.

The electric-photo conversion unit E/O 1302 operates as shown in FIG. 6(b). That is, when the electric input DIN (133) is OFF (0), the optical output OOUT (1312) is turned OFF. When DIN (133) is ON (1), OOUT (1312) is turned ON (1) and an optical output is sent to the optical fiber 50.

Figure 7:
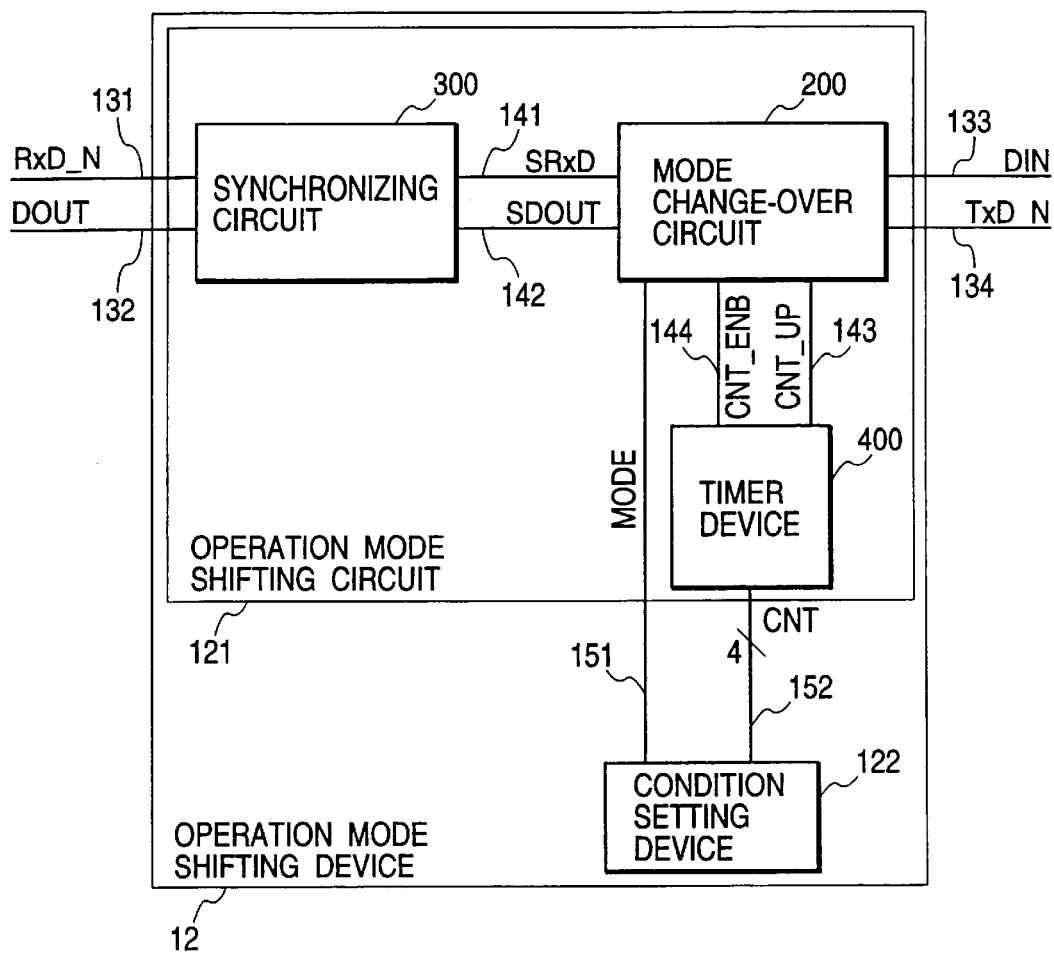
FIG. 7 is a diagram illustrating the constitution of an operation mode shifting device.

FIG. 7 is a diagram schematically illustrating an operation mode shifting device. The operation mode shifting device 12 is constituted by an operation mode shifting circuit 121 and a condition setting device 122. The operation mode shifting circuit 121 is constituted by a mode change-over circuit 200, a synchronizing circuit 300 and a timer device 400.

The synchronizing circuit 300 receives the output RxD_N (131) of the receiver 1101 in the bus driver circuit 11 and the output DOUT (132) of the photo-electric conversion unit 1301, turns the output RxD_N into SRxD (141) and turns DOUT into SDOUT (142) in synchronism with a clock of the mode change-over circuit 200, and sends them to the mode change-over circuit 200.

The mode change-over circuit 200 receives SRxD (141), SDOUT (142), a time-up signal CNT_UP (143) from the timer device 400 and a mode shift-setting signal MODE (151) from the condition setting device 122, and produces an input DIN (133) to the electric-photo conversion unit 1302, an input TxD_N (134) to the transmitter 1102, and a request for timer operation CNT_ENB (144) to the timer device 400.

Upon receipt of the request for timer operation CNT_ENB, the timer device 400 outputs the time-up signal CNT_UP (143) to the mode change-over circuit 200 after having counted the timer count number CNT (152) set by the condition setting device 122.

Figure 8:
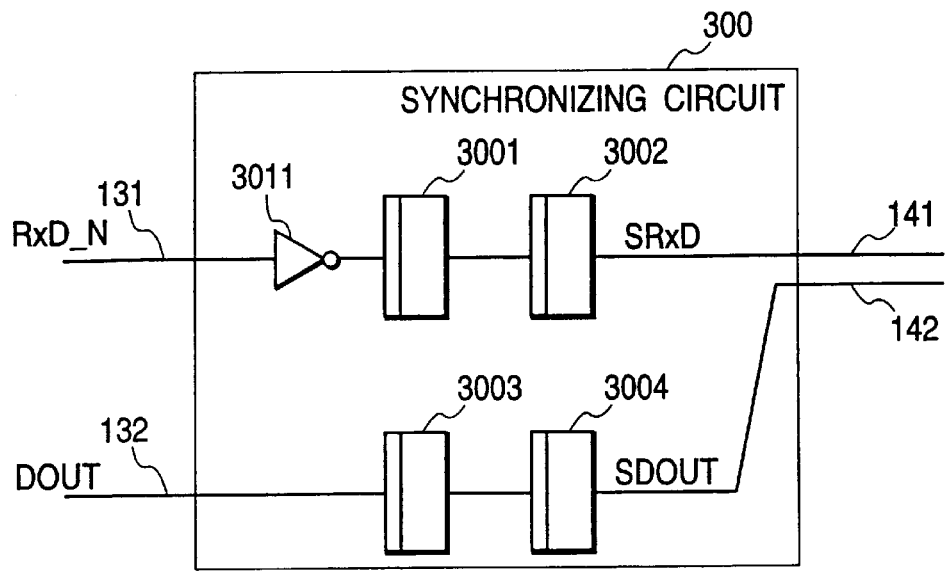
FIG. 8 is a diagram illustrating the constitution of a synchronizing circuit.

FIG. 8 illustrates the constitution of a synchronizing circuit. The synchronizing circuit 300 is constituted by a NOT circuit 3011, and four latches 3001 to 3004 for fetching data in synchronism with the clocks of the mode change-over circuit 200.

The signals RxD_N (131) and DOUT (132) inputted to the synchronizing circuit 300 change out of synchronism with the clocks of the mode change-over circuit 200. Therefore, the signals RxD_N and DOUT are converted, through two stages of latches, i.e., latches 3001, 3002 and latches 3003, 3004, into signals SRxD (141) and SDOUT (142) in synchronism with the clocks of the mode change-over circuit 200. The signal RxD_N is a negative logic signal and is inputted to the latch 3001 after it is converted into a positive logic signal through the NOT circuit 3011.

Figure 9:
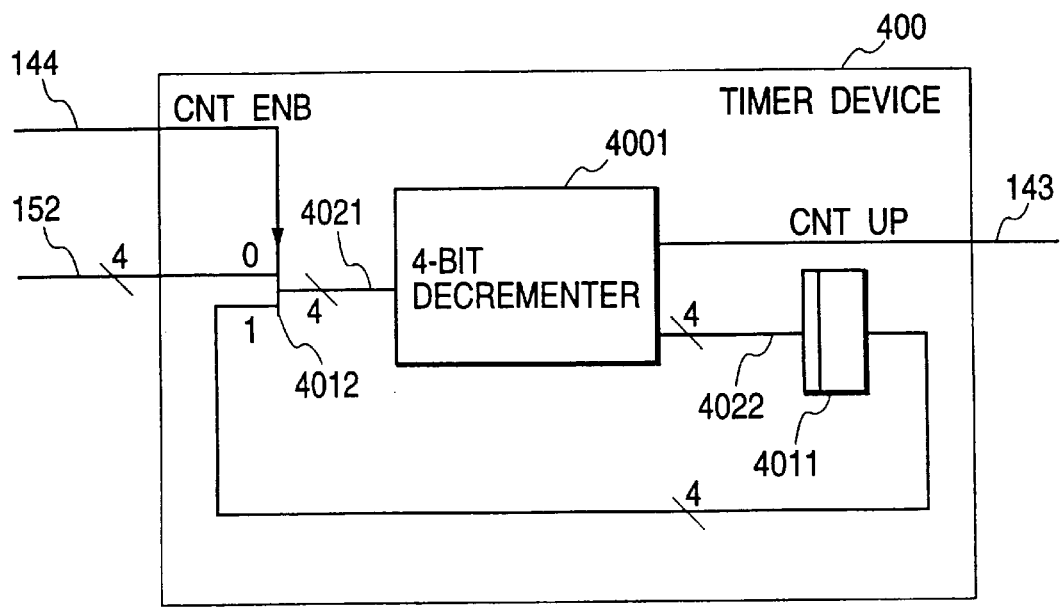
FIG. 9 is a diagram illustrating the constitution of a timer device.

FIG. 9 illustrates the constitution of a timer device. The timer device 400 is constituted by a selector 4012, a 4-bit decrementer 4001 and 4-bit-width latches 4011. The selector 4012 selects the output of the latch 4011 when the request for timer operation CNT_ENB (144) is ON (1), and selects the timer count number (152) when the CNT_ENB is OFF (0) and sends it to the 4-bit decrementer 4001. The 4-bit decrementer 4001 sends a value obtained by subtracting 1 from the output (4021) of the selector 4012 as an output (4022) to the latch 4011. When the input (4021) to the 4-bit decrementer 4001 is 0, a value 1 is outputted to CNT_UP (143). When the input (4021) is not 0, a value 0 is output to CNT_UP (143).

FIG. 10 is a truth table of the 4-bit decrementer. When the request for timer operation CNT_ENB (144) from the mode change-over circuit 200 is OFF, the selector 4021 in the timer device 400 selects the timer count number, and the latch 4011 latches a value obtained by subtracting 1 from the timer count number CNT. Next, as the CNT_ENB (144) is turned ON, the selector 4012 selects the output of the latch 4011. Therefore, the value held by the latch 4011 decreases by 1 every time when the clock rises. When the value thus held becomes 0, i.e., when the output (4021) of the latch 4011 becomes 0, a value 1 is outputted to the CNT_UP (143).

Thus, when the clocks are counted by the amount of the timer count number CNT after the request for timer operation CNT_ENB is turned ON, the timer device 400 outputs a time-up signal CNT_UP. The period of counting the count number CNT is a period of the non-observation mode that will be described later. As described earlier, the period of the non-observation mode is determined by the characteristics of the bus driver circuit 11 only irrespective of the transfer distance or the transfer rate.

Figure 11:
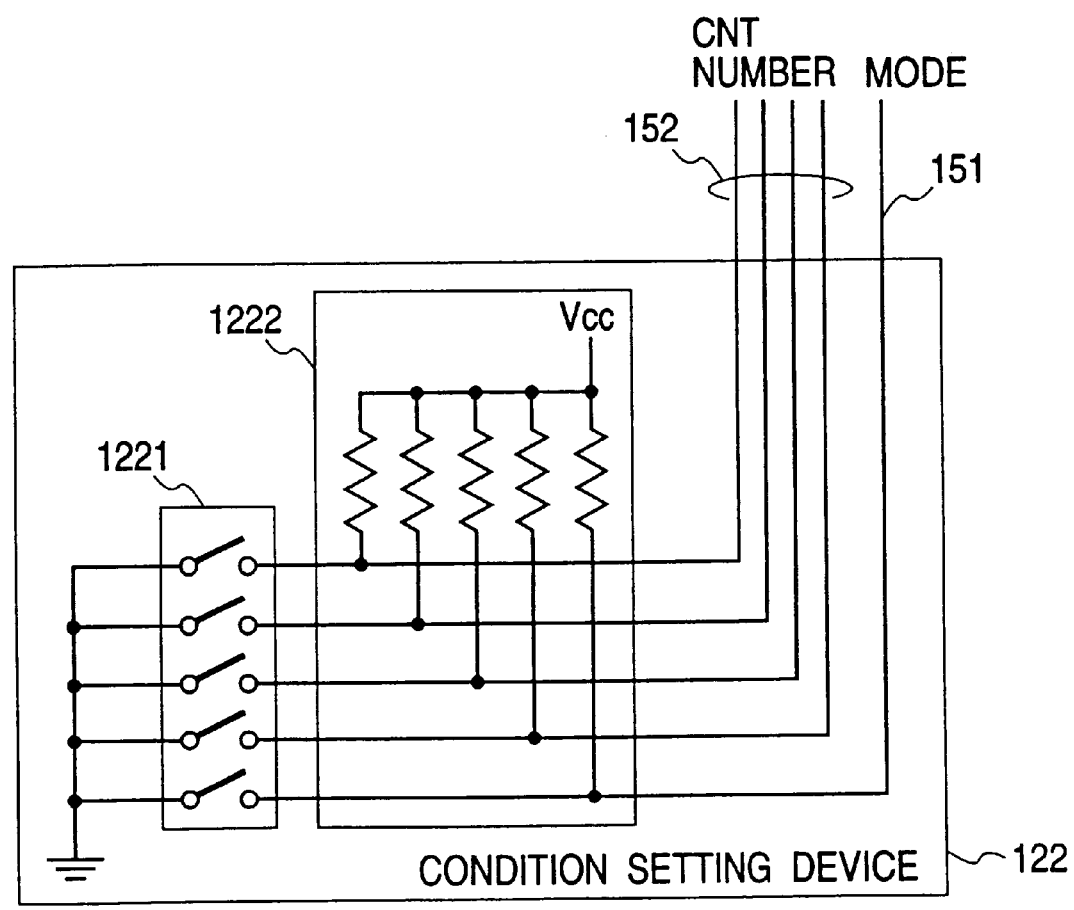
FIG. 11 is a diagram illustrating the constitution of a condition-setting device.

FIG. 11 is a diagram schematically illustrating a condition setting device. The condition setting device 122 is constituted by a 5-bit setting switch 1221 and a pull-up resistor 1222. A signal 0 is outputted to a signal line having a closed contact, and a signal 1 is outputted to an open signal line for every bit. Among the outputs of five bits, a bit of a signal line 151 forms a mode shift-setting signal MODE, and four bits of four signal lines 152 form a timer count number CNT. The mode shift-setting signals MODEs of the two optical bus-bridging devices connected through an optical fiber are so set as will be opposite to each other. As will be described later, the optical bus-bridging device 10 in which MODE=0 is set, shifts its own mode to the bus drive mode when it conflicts with other optical output modes.

Next, described below is the operation mode shifting circuit 121. In order that the states of the buses 20a and 20b connected together through the optical fiber 50 are brought into proper agreement in both directions, the operation mode shifting circuit 121 judges the state of the bus of its own side and the state of optical input from the optical fiber, and the portions of the optical bus-bridging device 10 execute the corresponding operations depending upon the mode changed over by the mode change-over circuit 200.

Figures 12A, 12B:
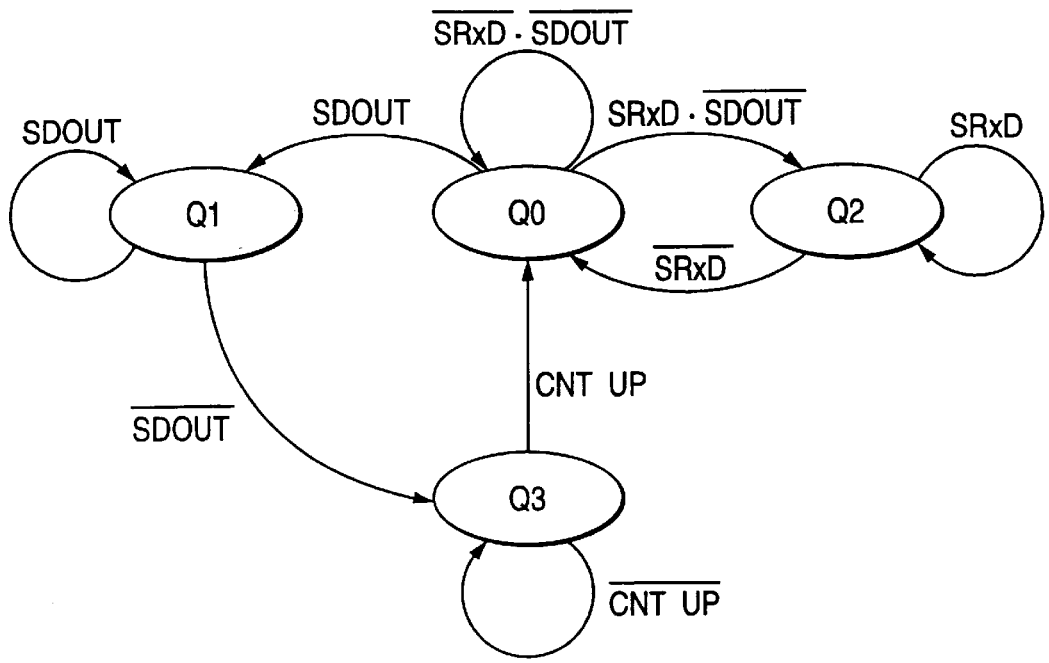
FIG. 12 is a diagram illustrating the mode-shifting operation of a mode change-over circuit.
Figures 13A, 13B:
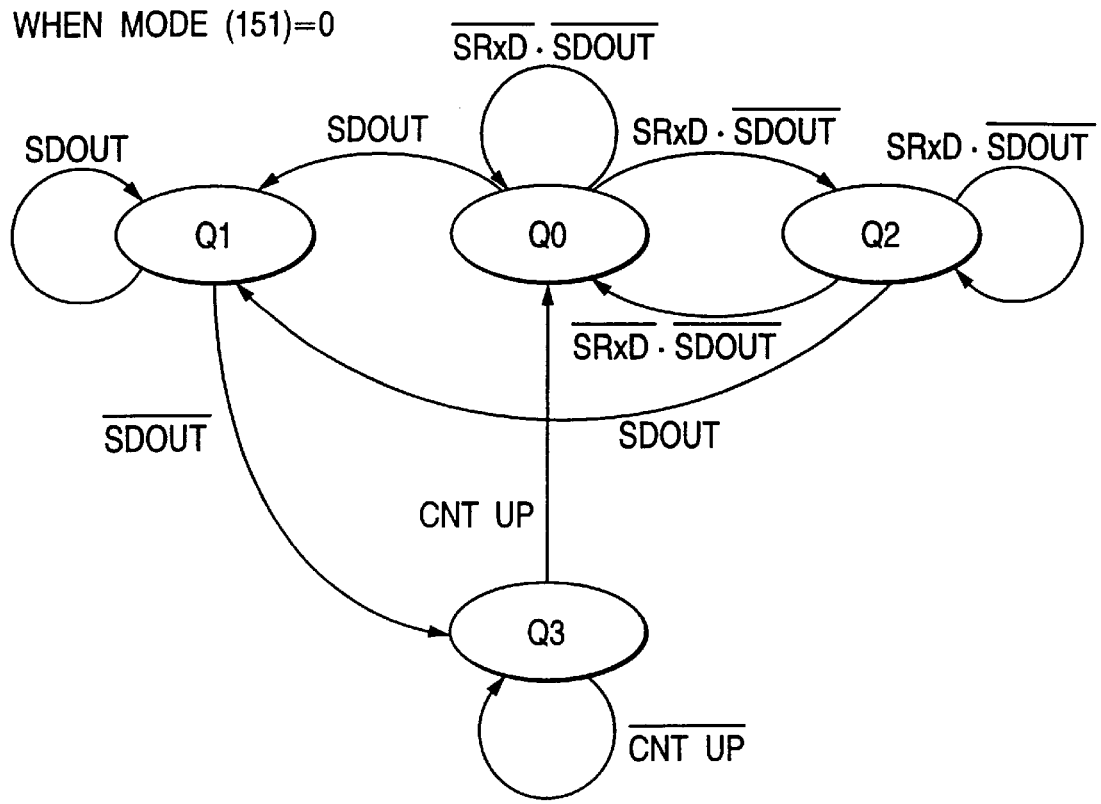
FIG. 13 is a diagram illustrating another mode-shifting operation of the mode change-over circuit.

FIGS. 12 and 13 are diagrams illustrating the operation for changing over the mode of the operation mode shifting device. Both FIGS. 12(a) and 13(a) are diagrams illustrating the shift of the states upon changing over the mode, and illustrate a standby mode Q0 in which neither optical output nor bus drive is effected, a bus drive mode Q1 in which the bus only is driven, an optical output mode Q2 in which an optical output only is effected, and a non-observation mode Q3 which is passed through when the bus drive mode Q1 is shifted to the standby mode Q0.

In FIG. 12, the optical output mode Q2 is not shifted to the bus drive mode Q1 under the condition where the mode shift-setting signal MODE (151)=1. FIG. 12(b) shows the outputs of the mode change-over circuit 200.

First, described below is the operation in the standby mode Q0. In the mode Q0, the bus 20 which is the input to the optical bus-bridging device 10 is in the OFF state and the optical input OIN (1311) to the photo-electric converter 13 is OFF. Therefore, the outputs SRxD (141) and SDOUT (142) of the synchronizing circuit 300 both assume the logic 0. Accordingly, the mode change-over circuit 200 produces DIN (133) which is OFF, TxD_N (134) which is OFF and CNT_ENB (144) which is OFF. Therefore, the optical output OOUT (1312) is not sent to the optical fiber 50, the bus 20 is not driven (BUSH (31)–BUSL (32)<Vth), and the timer device 400 does not work.

When the bus 20 is driven to assume the ON state during the standby mode Q0, the output RxD_N (131) of the bus driver circuit 11 is turned ON, and the output SRxD (141) of the synchronizing circuit 300 changes from the logic 0 to the logic 1. In response to this, the mode change-over circuit 200 shifts the mode from the mode Q0 into the optical output mode Q2.

When the light is inputted to the photo-electric converter 13 through the optical fiber 50 during the standby mode Q0, furthermore, DOUT (132) is turned ON. Accordingly, the output SDOUT (142) of the synchronizing circuit 300 changes from the logic 0 to the logic 1. In response to this, the mode change-over circuit 200 shifts the mode from the mode Q0 into the bus drive mode Q1.

Thus, when the drive mode of the bus 20 of its own side is observed, the operation mode shifting device 12 in which MODE=1 has been set, changes the mode from the standby mode Q0 into the optical output mode Q2 but does not shift the mode from the mode Q2 to the mode Q1. When the optical input from the optical fiber 50 is observed, on the other hand, the mode is shifted from the mode Q0 to the mode Q1. This makes it possible to avoid the formation of the above-mentioned optical loop.

Next, described below is the operation in the bus drive mode Q1. In the mode Q1, the mode change-over circuit 200 outputs DIN (133) which is OFF, TxD_N (134) which is ON and CNT_ENB (144) which is OFF. Therefore, the transmitter 1102 in the bus driver circuit 11 is turned ON, and the bus 20a is driven. On the other hand, since DIN (133) is OFF, no output is sent to the optical fiber 50, and the timer device 400 does not operate.

When there is an optical input from the optical fiber 50 (i.e., when there is a request for drive from the other system) in the mode Q1, the output DOUT (132) of the photo-electric converter 13 is turned ON, the output SDOUT (142) of the synchronizing circuit 300 maintains the logic 1, and the bus 20 is maintained in the driven mode.

Due to the structure of the bus driver circuit 11, furthermore, the output of the transmitter 1102 directly serves as an input to the receiver 1101. Therefore, when the TxD_N (134) is turned ON and the transmitter 1102 is turned ON to drive the bus 20a, the receiver 1101 is turned ON and RxD_N (131) is turned ON. Accordingly, the output SRxD (141) of the synchronizing circuit 300 assumes the logic 1. However, since the mode change-over circuit 200 does not observe the output SRxD (141) in the bus drive mode Q1, the operation is not affected by the change of the synchronizing circuit 300.

When the optical input from the optical fiber 50 extinguishes in the bus drive mode Q1, the output DOUT (132) of the photo-electric converter 13 is turned OFF, and the output SDOUT (142) of the synchronizing circuit 300 assumes the logic 0. In response to this, the mode change-over circuit 200 changes the mode from the mode Q1 to the non-observation mode Q3.

In the bus drive mode Q1 as described above, the ON mode is continued for a short period of time after TxD_N (134) is turned OFF. This transient period is the non-observation mode which prevents the optical bus-bridging device 10 from erroneously judging that the bus is being driven.

Next, described below is the operation in the optical output mode Q2. In the mode Q2, the output DIN (133) of the mode change-over circuit 200 is turned ON, TxD_N (134) is turned OFF and CNT_ENB (144) is turned OFF. Therefore, OOUT (1312) of the photoelectric converter 13 is turned ON and an optical output is sent onto the optical fiber 50. On the other hand, since TxD_N (134) is turned OFF, the bus 20 is not driven and the timer device 400 does not operate.

While the bus 20 has been driven in the optical output mode Q2, the output RxD_N (131) of the receiver 1101 in the bus driver circuit 11 is turned ON. Accordingly, SRxD (141) maintains the logic 1 and the mode change-over circuit 200 maintains the mode Q2.

When there is an optical input from the other system through the optical fiber 50 while the optical bus-bridging device 10 is in the optical output mode Q2, DOUT (132) is turned ON and SDOUT (142) is turned ON, resulting in the occurrence of the above-mentioned "crossing situation". When MODE (151)=1 is being set by the condition setting device 122, however, the mode change-over circuit 200 does not observe SDOUT (142) in the mode Q2. Therefore, the "crossing situation" does not occur, and the optical output mode Q2 is stably maintained.

When the bus 20 assumes the OFF mode in the optical output mode Q2, the output RxD_N (131) of the bus driver circuit 11 is turned OFF, and the output SRxD (141) of the synchronizing circuit 300 changes from the logic 1 to the logic 0. In response to this, the mode change-over circuit 200 shifts the mode from the mode Q2 to the standby mode Q0. Unlike the case of the mode Q1, the mode Q2 is shifted to the mode Q0 after the mode of the bus 20 has been stabilized. Therefore, the input SRXD (141) to the mode change-over circuit 200 is not erroneously regarded to be turned on, and no error occurs in the operation despite the mode is readily shifted to the standby mode Q0.

Next, described below is the operation in the non-observation mode Q3. In the mode Q3, the output DIN (133) of the mode change-over circuit 200 is turned OFF, TxD_N (134) is turned OFF and CNT_ENB (144) is turned ON. Therefore, the timer 400 operates, effects the counting set by the condition setting device for every clock, and outputs the time-up signal CNT_UP (143) when the preset count number CNT (152) is reached.

In the mode Q3, the mode change-over circuit 200 observes neither SRxD (141) nor SDOUT (142), and observes the output CNT_UP (143) of the timer device 400 only. The mode Q3 is maintained during the period in which CNT_UP=0. In the non-observation period in the mode Q3, the optical bus-bridging device 10 no longer drives the bus 20, and the bus 20 stably assumes the OFF mode. When the output CNT_UP=1 is produced, the mode change-over circuit 200 shifts the mode from the mode Q3 to the mode Q0, and observes SRxD (141) and SDOUT (142) again. This prevents the optical bus-bridging device 10 from being erroneously operated due to a transient change in the mode of the bus.

In FIG. 13, the optical output mode Q2 is shifted to the bus drive mode Q1 under the condition where the mode shift-setting signal MODE (151)=0. The diagram of shifting the mode in FIG. 13(a) is different from that of FIG. 12(a) only in regard to the operation under the "crossing situation" in the optical output mode Q2. The difference will now be described.

In the optical output mode Q2, MODE is 0 and, hence, the mode change-over circuit 200 observes the change in the output DOUT (132) of the photo-electric converter 13. When there is an optical input from the optical fiber 50, therefore, DOUT (132) is turned ON and SDOUT (142) changes from the logic 0 to the logic 1. In response to this, the mode change-over circuit 200 judges that the "crossing situation" is occurring and shifts the mode Q2 into the bus drive mode Q1. As a result, DIN (133) is turned OFF and TxD_N (134) is turned ON, whereby the optical output of the photo-electric converter 13a is turned OFF, and the "crossing situation" is eliminated.

Accordingly, despite the buses 20a and 20b are driven to assume the ON mode during the same transfer cycle, the buses are not vibrated due to the "crossing situation"; i.e., the buses 20a and 20b are brought into proper agreement.

Figure 14:
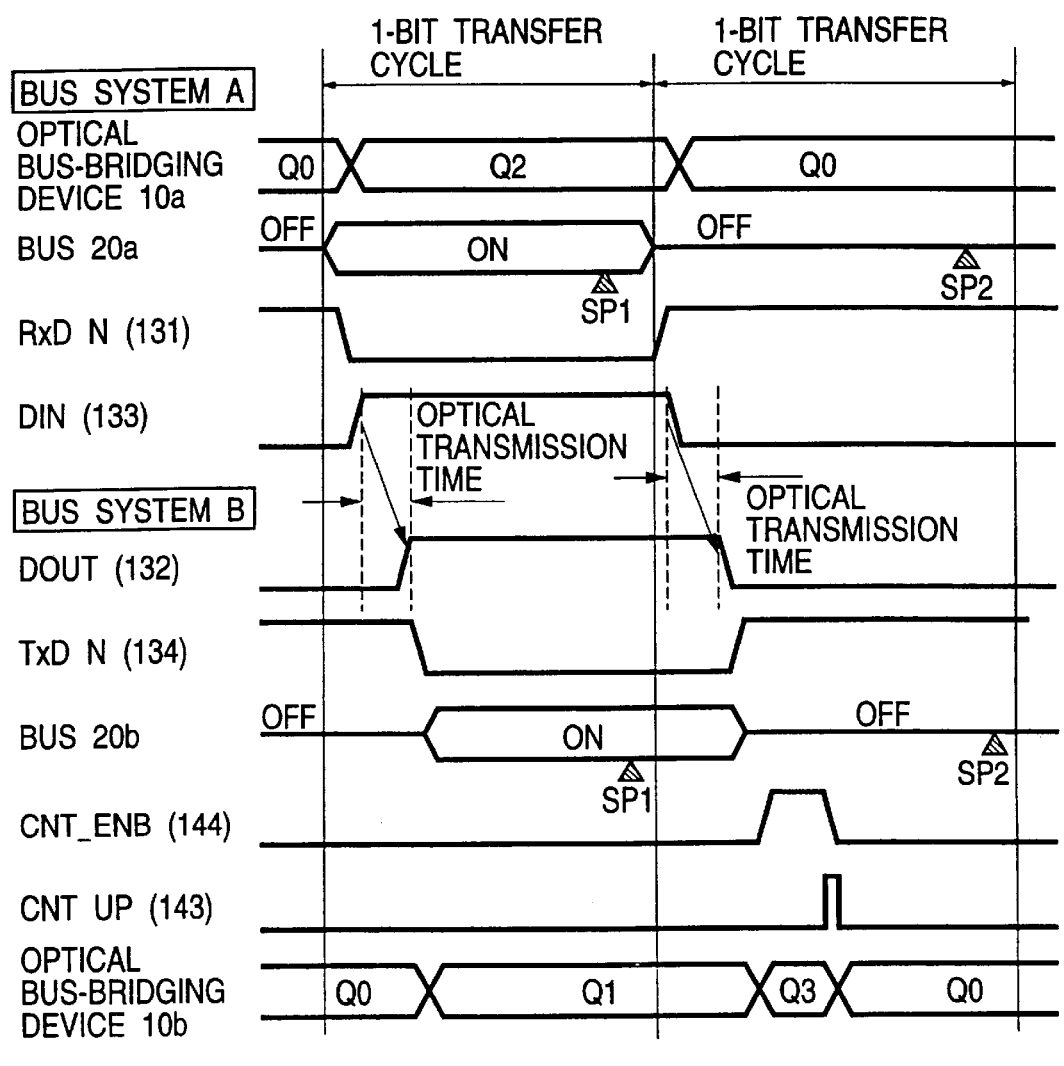
FIG. 14 is a diagram of a timing chart illustrating the operation of the optical communication system.

FIG. 14 is a timing chart illustrating the operation of an optical communication system according to the embodiment. FIG. 14 illustrates the operation of every portion of the system of FIG. 1 in a mode where the node 30a (or 30b) connected to the bus 20a drives the bus 20a to assume the ON mode in a given transfer cycle and no longer drives the bus 20a in a next transfer cycle so that it assumes the OFF mode.

First, the optical bus-bridging devices 10a and 10b of the systems A and B are both in the standby mode Q0. When the bus 20a of the system A assumes the ON mode, the output RxD_N (131) of the bus driver circuit 11a changes from the logic 1 to the logic 0, and the input of the mode change-over circuit 200 (output of the synchronizing circuit 300) SRxD (141) changes from the logic 0 to the logic 1. In accordance with the diagram of shift of FIG. 12(a), the mode change-over circuit 200 shifts the mode from the standby mode Q0 to the optical output mode Q2, and the output DIN (133) changes from the logic 0 to the logic 1.

In response to a change in the output DIN (133), the optical output OOUT (1312) of the photo-electric converter 13a is turned ON and is transmitted to the optical bus-bridging device 10b of the system B through the optical fiber 50. The optical input OIN (1311) of the photo-electric converter 13b is turned ON, and the output DOUT (132) changes from the logic 0 to the logic 1. A delay due to the optical transmission time occurs from a change in the DIN (133) in the system A up to the DOUT (132) in the system B.

Upon receipt of DOUT (132), the mode change-over circuit 200 in the system B shifts the mode from the standby mode Q0 to the bus drive mode Q1 as shown in FIG. 12(a), and the output TxD_N (134) changes from the logic 1 to the logic 0. Upon receipt of a change in the TxD_N (134), the bus driver circuit 11b drives the bus B 20b to assume the ON mode.

As described above, the ON mode of the bus 20a is transferred to the bus 20b through the optical bus-bridging devices 10a and 10b, and the node 30b (or 30a) fetches the mode from the bus 20a and the nodes 30c and 30d fetch the mode from the bus B 20b at the sampling point SP1 at the end of the transfer time of one bit, to make sure that the bus is in the ON mode. That is, the data of one bit is transferred as the bus 20 is driven by the node 30a to assume the ON mode.

When the node 30a (or 30b) no longer drives the bus 20a in the next transfer cycle, the output RxD_N (131) of the bus driver circuit 11a changes from the logic 0 to the logic 1. Due to this change, the mode change-over circuit 200 shifts the mode from the mode Q2 to the mode Q0, whereby the output DIN (133) changes from the logic 0 to the logic 1, and the optical output OOUT (132) of the photo-electric converter 13a is turned OFF.

In the optical bus-bridging device 20b of the system B, therefore, the optical input OIN (1311) from the optical fiber 50 is turned OFF, and the output DOUT (132) changes from the logic 1 to the logic 0. In this case, too, a delay occurs due to the optical transmission time. As the output DOUT (132) changes to 0, the mode change-over circuit 200 shifts the mode from the mode Q1 to the mode Q3 in accordance with FIG. 12(a).

In the non-observation mode Q3, the mode change-over circuit 200 changes CNT_ENB (144) from the logic 0 to the logic 1 to operate the timer device 400, and neglects the input SRxD (141) by the observed value RxD_N (131). In the non-observation mode Q3, furthermore, the nodes 30c and 30d are entering into the next bit transfer cycle and, hence, the bus 20b may have been driven by the nodes 30c and 30d to assume the ON mode (in an example of FIG. 14, the bus 20b has not been driven but has been changed from the ON mode to the OFF mode).

In the non-observation mode Q3, therefore, a mode is imparted in which the bus 20b is not observed in order to prevent the transient period in which the bus 20b changes from the ON mode to the OFF mode from being erroneously regarded to be in the mode that the bus is being driven by a node in the system B. When the nodes 30c and 30d are driving the bus 20b to assume the ON mode, SRxD (141) is observed again when the non-observation mode Q3 is shifted to the standby mode Q0. Accordingly, the mode is shifted to the optical output mode Q2 to properly recognize the mode of the bus 20b.

When the output CNT_UP (143) of the timer device 400 changes from the logic 0 to the logic 1, the mode change-over circuit 200 shifts the mode from the mode Q3 to the mode Q0 to observe the bus 20b again. When not being driven by the nodes 30c, 30d of the system B as in the embodiment of FIG. 14, therefore, the bus 20b assumes the OFF mode, and the nodes 30b to 30d fetch the OFF mode at a sampling point SP2.

Figure 15:
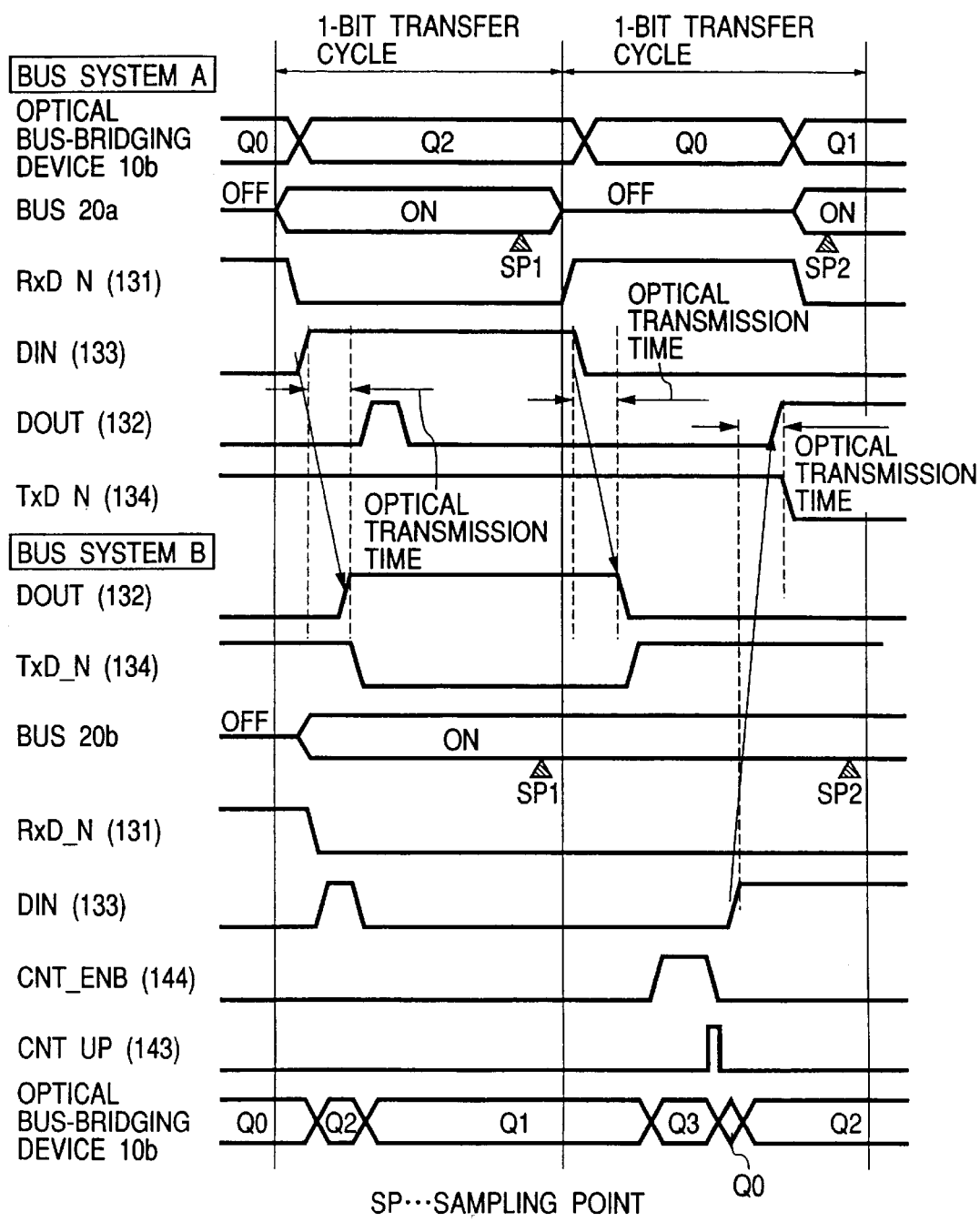
FIG. 15 is a diagram of a timing chart illustrating another operation of the optical communication system.

FIG. 15 is a timing chart of a mode different from that of FIG. 14. In this example, the buses 20a and 20b are driven to assume the ON mode in a given transfer cycle and in a next transfer cycle, MODE (151)=1 is set to the operation mode shifting device 12a of the system A and MODE (151)=0 is set to the operation mode shifting device 12b of the system B in a mode where the bus 20 has not been driven.

When the buses 20a and 20b are driven to assume the ON mode in the same transfer cycle, the input RxD_N (131) from the bus driver circuits 11a, 11b changes from the logic 1 to the logic 0. In response to this change, both the operation mode shifting devices 12a and 12b shift the mode from the mode Q0 to the mode Q2, whereby the output DIN (133) changes from the logic 0 to the logic 1, and the photo-electric converters 13a and 13b produce optical outputs OOUT (1312) which are turned ON.

Therefore, the ON mode is transmitted in the two directions through two optical fibers 50, and the electric outputs DOUT (132) of the photo-electric converters 13a and 13b change from the logic 0 to the logic 1. In this case, since MODE (151)=0, the operation mode shifting device 12b changes the mode from the mode Q2 to the mode Q1 as shown in FIG. 13(a), whereby both the outputs DIN (133) and TxD_N (134) change from the logic 1 to the logic 0, the optical output OOUT (1312) of the photo-electric converter 13b is turned OFF, and the bus driver circuit 11b drives the bus 20b to assume the ON mode.

At the sampling point SP1, the nodes 30a to 30d fetch the states of the buses 20a and 20b, and fetch a bit of the ON mode.

In the next transfer cycle, the node 30a (or 30b) no longer drives the bus 20a which is in the ON mode. Therefore, the operation mode shifting device 12a shifts the mode from the mode Q2 to the mode Q0, and the output DIN (133) changes from the logic 1 to the logic 0. Accordingly, the optical output OOUT (1312) of the photo-electric converter 13a is turned OFF.

Upon receipt of a change in the optical output OOUT (1312), the electric output DOUT (132) of the photo-electric converter 13b changes from the logic 1 to the logic 0, the operation mode shifting device 12b shifts the mode from the mode Q1 to the mode Q3, changes CNT_ENB (144) from the logic 0 to the logic 1, and causes the timer device 400 to operate. Then, when the output CNT_UP (143) of the timer device 400 changes from the logic 0 to the logic 1, the operation mode shifting device 12b shifts the mode from the mode Q3 to the mode Q0. However, since the node 30c (or 30d) is driving the bus 20b, the input RxD_N (131) to the operation mode shifting device 12b still maintains the logic 0.

Accordingly, the operation mode shifting device 12b shifts the mode from the mode Q0 to the mode Q2, changes the output DIN (133) from the logic 0 to the logic 1, and whereby the optical output OOUT (1312) of the photo-electric converter 13b is turned ON. The photo-electric converter 13a that has received this change through the optical fiber 50 changes the electric output DOUT (132) from the logic 0 to the logic 1.

Due to a change in the output DOUT (132), the operation mode shifting device 12a shifts the mode from the mode Q0 to the mode Q1, changes TxD_N (134) from the logic 1 to the logic 0, and the bus driver circuit 11a drives the bus 20a to assume the ON mode. At the sampling point SP2, therefore, the nodes 30a to 30d fetch the ON mode from the buses 20a and 20b.

As described above, the buses 20a and 20b are brought into agreement, and the data are properly transferred.

Figure 16:
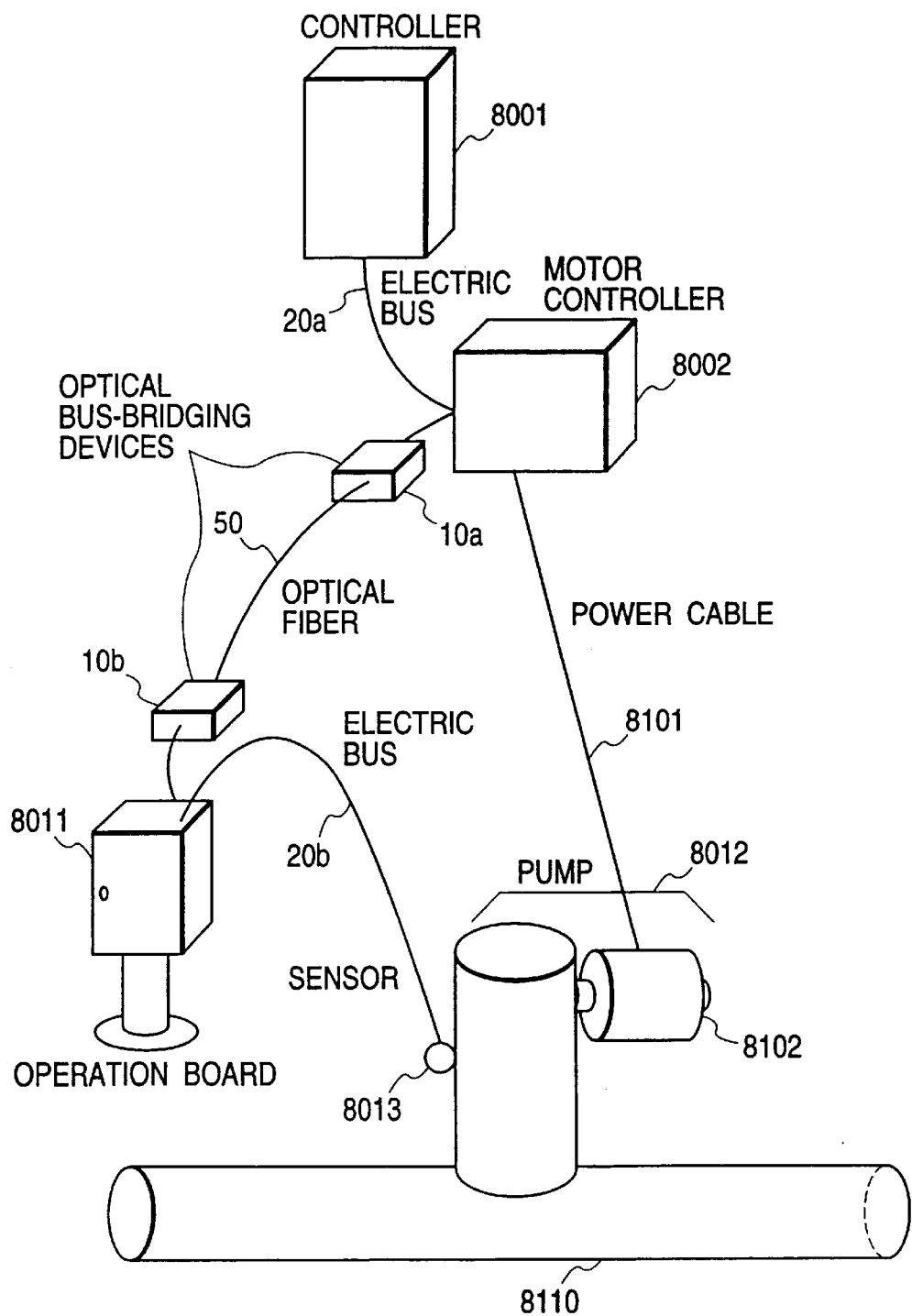
FIG. 16 is a diagram illustrating the constitution of a water supply and drainage system to which the present invention is applied.
Figure 17:
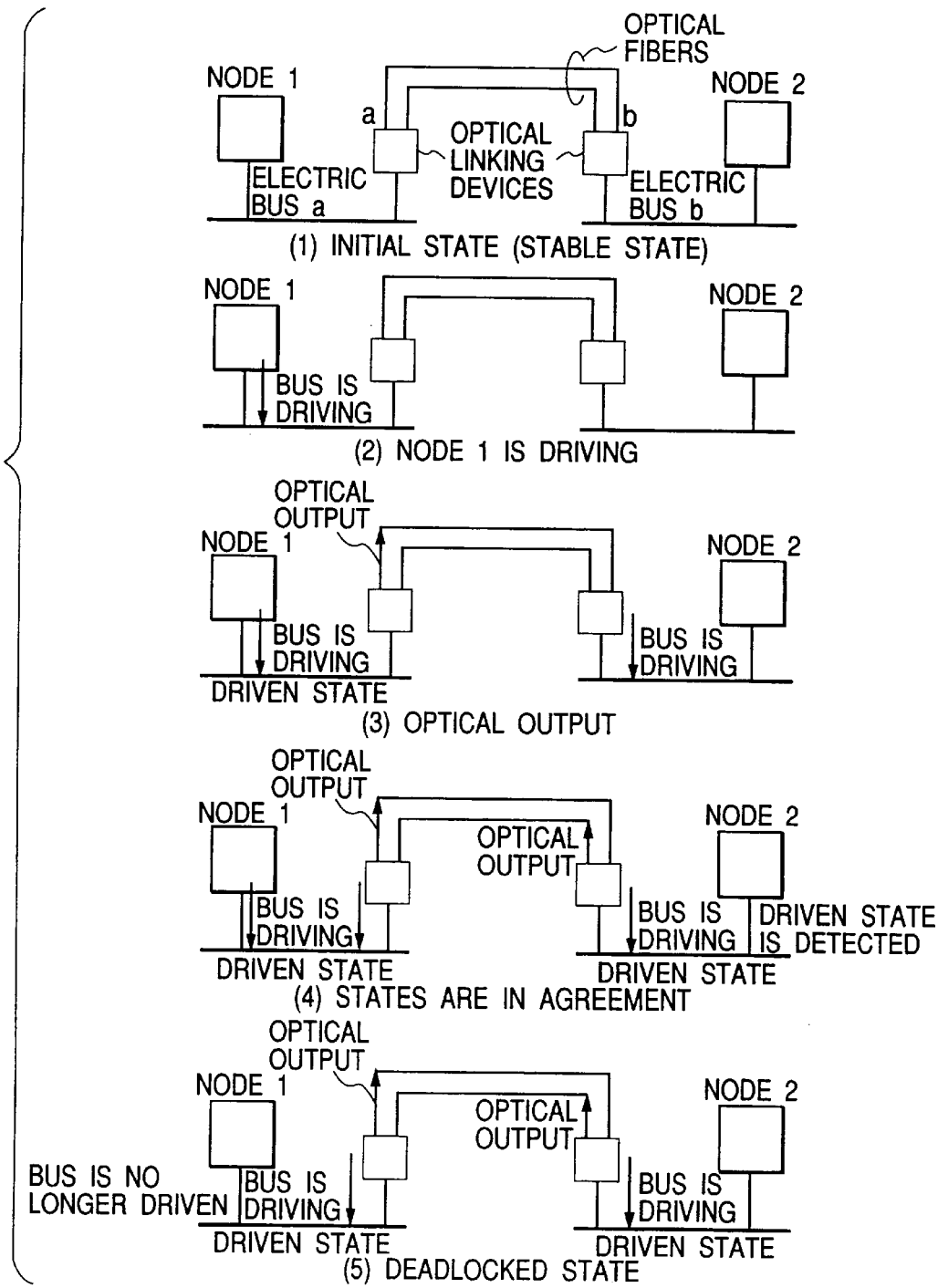
FIG. 17 is a diagram illustrating a problem at the time of connecting optical fibers between the electric buses.
Figure 18:
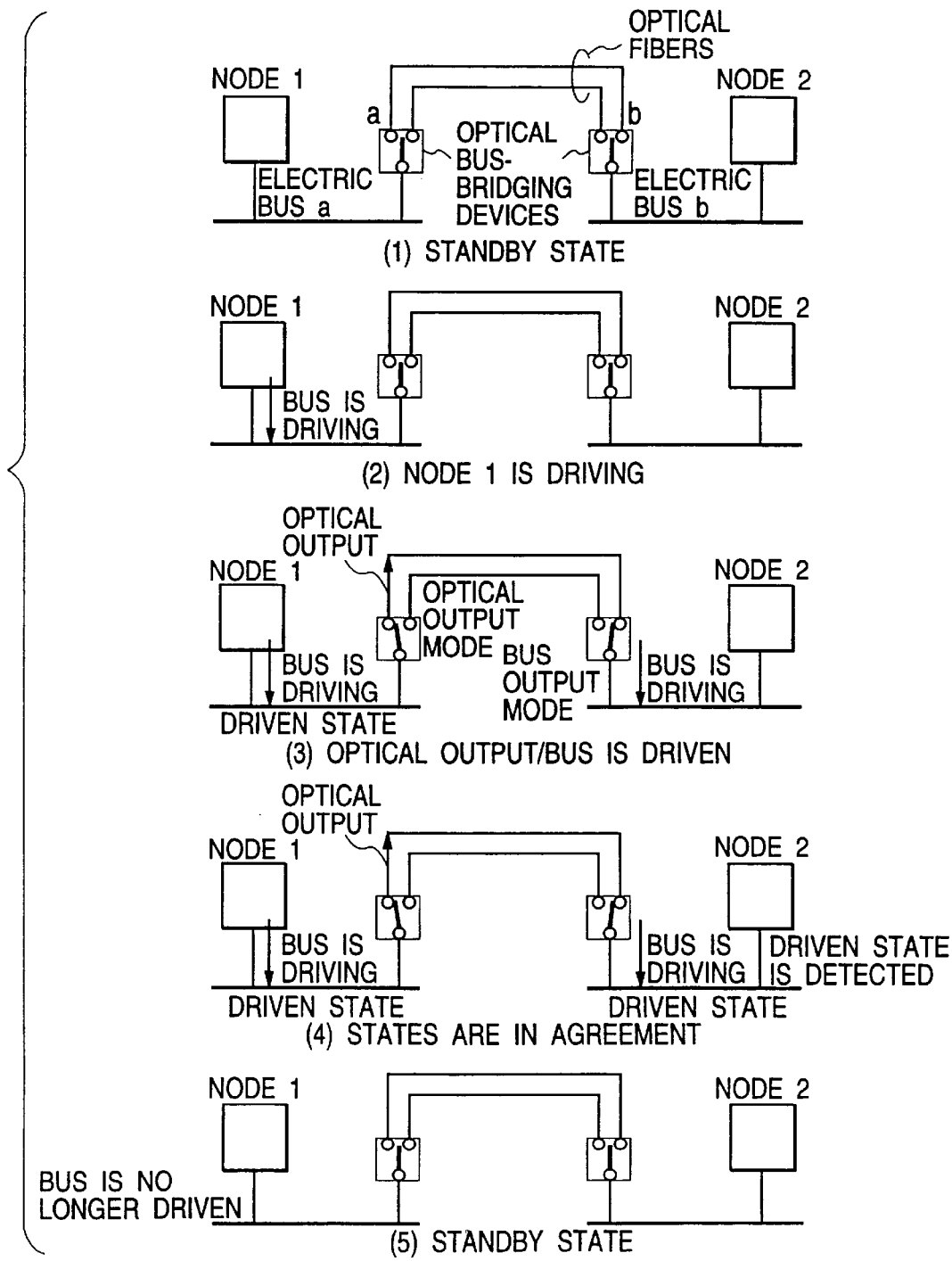
FIG. 18 is a diagram schematically illustrating the steps for bringing into agreement the buses using the optical bus-bridging devices of the present invention.

Next, described below is an example to which the present invention is adapted. FIG. 16 illustrates a water supply system to which the optical bus-bridging devices of the present invention are applied. A controller 8001 controls a pump 8012 through a motor controller 8002, and maintains the pressure constant in a main water supply tube 8110 to supply water in proper amounts.

The controller 8001 is connected to the motor controller 8002 and to the optical bus-bridging device 10a through the electric bus 20a. An operation board 8011 is connected to a sensor 8013 attached to the main water supply tube 8110 and to the optical bus-bridging device 10b through the electric bus 20b. The optical bus-bridging devices 10a and 10b are connected together through the optical fiber 50. The motor controller 8002 and a motor 8102 for driving a pump 8012 are connected together through a power line 8101. The sensor 8013 is a pressure gauge which indicates a pressure in the main water supply tube 8110 produced by the pump. The mode shift-setting signals of the optical bus-bridging devices 10a and 10b have been set to be opposite relative to each other.

The controller 8001, the motor controller 8002 and the sensor 8013 constituting the system, are equipped with known functions for effecting the communication according to a communication protocol stipulated under ISO11898; i.e., a multi-master system is constituted in which both the controller 8001 and the operation board 8011 can become masters.

Described below is the operation of the water supply system. The controller 8001 requests the sensor 8013 to output the pressure in the main water supply tube 8110, and the sensor 8013 outputs the pressure in the main water supply tube 8110. Next, the controller 8001 sends an instruction to the motor controller 8002 to raise the pressure when the pressure in the main water supply tube 8110 is lower than a predetermined value and, on the other hand, to lower the pressure when the pressure is too high. Upon receipt of an instruction from the controller 8001, the motor controller 8002 controls the pump 8012 by changing the current and voltage fed to the motor 8102 that drives the pump 8012, in order to change the pressure in the main water supply tube 8110. The above-mentioned operation is executed every time after a predetermined period in order to maintain a predetermined pressure in the main water supply tube 8110.

Next, described below is a processing from the operation board 8011. In case the controller 8001 becomes defective or the pump 8012 must be stopped due to emergency, an operator manually operates the operation board 8011 to send an instruction. The operation board 8011 includes a manual/automatic change-over switch, an emergency stop switch for stopping the pump 8012 in case of emergency, a dial for setting a voltage and a current supplied to the motor 8102, a meter for indicating the pressure in the main water supply tube 8110, and the like. The pressure in the main water supply tube 8110 is read by the sensor 8013 every time after a predetermined period, and is indicated on a meter. When the automatic/manual change-over switch has been set to the manual side, a voltage and a current instructed by the operator are transferred to the motor controller 8002.

To effect the control operation through the operation board 8011, first, the automatic/manual change-over switch is set to the manual side. Then, a stop signal is outputted to the controller 8001 and no instruction is sent from the controller 8001. Next, upon seeing the pressure in the main water supply tube 8110 indicated on the meter, a voltage and a current to the motor 8102 for driving the pump 8012 are judged and are set using a setting dial. When an emergency stop switch is depressed, furthermore, a stop signal is sent to the motor controller 8002 to stop the pump 8012. Thus, the pump 8012 is manually controlled.

Described below is the multi-master operation in the case when the outputs are simultaneously produced from the controller 8001 and the operation board 8011. When packets are simultaneously produced from the controller 8001 and the operation board 8011, arbitration is necessary.

According to ISO11898, the bus is driven when the logic 0 is outputted to the bus but is not driven when the logic 1 is outputted thereto. Therefore, when the logic 0 is outputted even by a single node, the bus as a whole is driven to exhibit the logic 0. That is, the logic 0 takes a precedence. It is further a prerequisite that the drive mode has been transferred to all nodes within a time of transferring a bit. Upon observing the mode of the bus at the end of the bit transfer time, therefore, the transfer of data of a bit ends within the time of transferring the bit. Even when no data is being transmitted, every node is observing the value of the bus and can recognize the end of the packet. When the transmission of packets is started from a plurality of nodes, therefore, there can be learned the timings for transmitting the packets. Therefore, the packets are necessarily transmitted simultaneously.

From the foregoing, the arbitration is realized in the following manner according to ISO11898. The packet has a structure as shown in FIG. 4(c) and in which the order of priority of packet is set to the header 7001, and the packets having the same order of priority are never simultaneously transmitted from different nodes. When the header 7001 is being transmitted, therefore, the node transmitting the packet compares the value which it has outputted to the bus with the mode of the bus at the time when the mode of the bus is observed while a bit is being transferred. When they are not in agreement (the node has outputted the logic 1 and the bus is in a mode of being driven), the node interrupts the transmission of the packet and simply observes the mode of the bus until it becomes possible to transmit the next packet.

Thus, when the transfer of the header 7001 ends, only the node that has transmitted the packet having the highest order of priority remains, and the other nodes all observe the mode of the bus. Arbitration is thus carried out.

Figure 19:
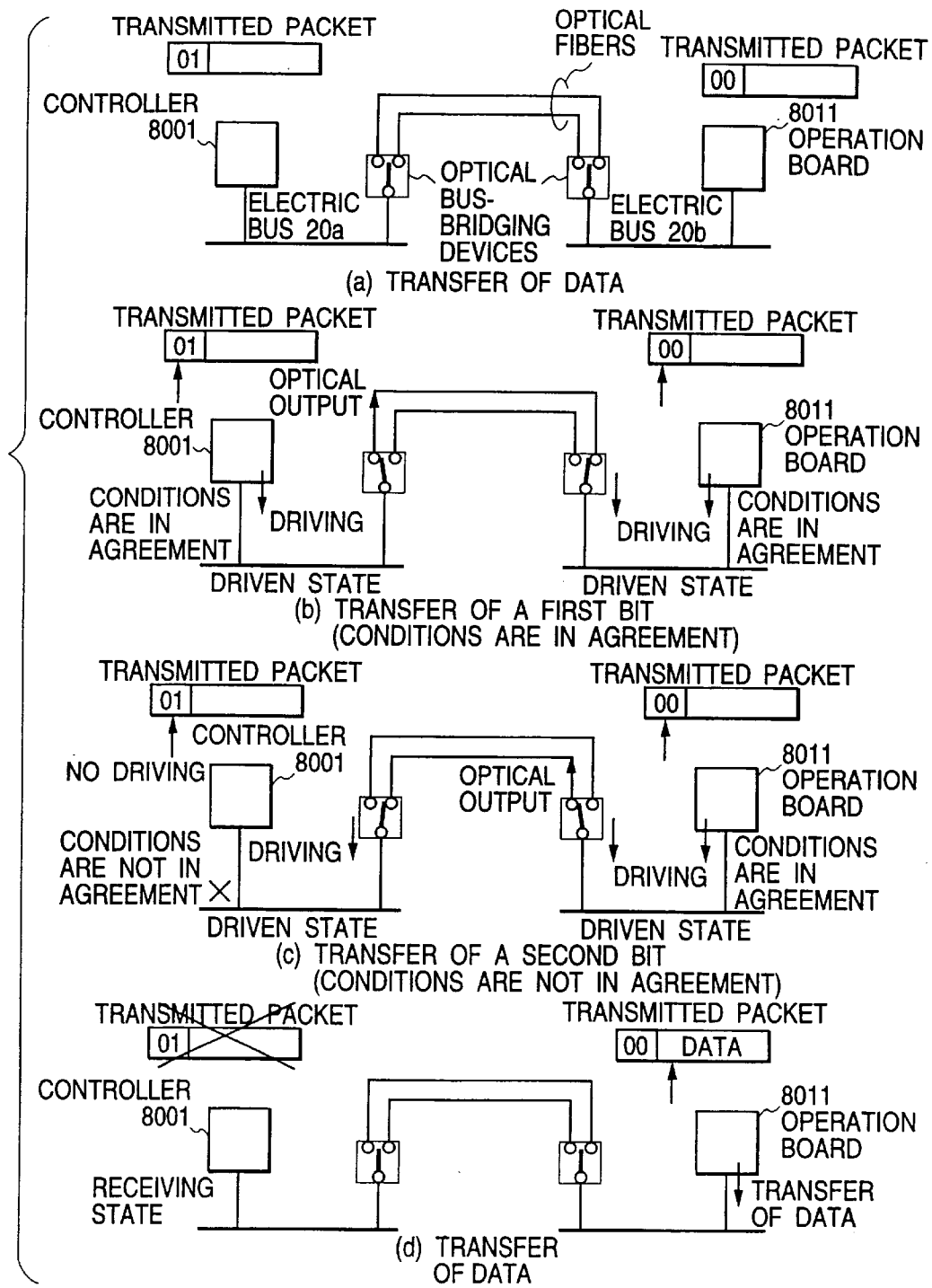
FIG. 19 is a diagram illustrating the operations for arbitrating the simultaneous packet transmission from a plurality of nodes and for bringing the states of the buses into agreement.

FIG. 19 is a diagram of shift for explaining the arbitration in the system.

(a) The order of priority of a packet in the water supply and sewage system is higher when it is that of an instruction by a man through the operation board 8011 than that of an instruction from the controller 8001. Therefore, the first two bits of the header 7001 of a packet transmitted from the operation board are set to be 00, and the first two bits of the header 7001 of a packet transmitted from the controller are set to be 01.

(b) The transmission of packets is started from the controller 8001 and the operation board 8011; i.e., first bits are transmitted, respectively. The first bits of the headers 7001 from the controller 8001 and the operation board 8011 are both 0, and both drive the electric buses 20a and 20b. The electric buses 20a and 20b are both driven. The electric buses 20a and 20b are driven after having been monitored by the controller 8001 and the operation board 8011. Accordingly, the modes in which the buses are driven are in agreement with each other.

(c) Then, the second bits are transferred. The second bit of the controller 8001 is 1 which does not drive the electric bus 20a. The second bit of the operation board 8011 is 0 which drives the electric bus 20b. Therefore, the optical bus-bridging device 10a assumes the mode of the bus drive mode, the optical bus-bridging device 10b assumes the mode of the optical output mode, and the electric buses 20a and 20b both assume the mode in which they are driven. In the controller 8001, therefore, driving of the bus is not in agreement with the mode of the bus 20a. In the operation board 8011, on the other hand, driving of the bus is in agreement with the mode in which the bus 20b is driven.

(d) Accordingly, the controller 8001 no longer transmits the packet but assumes the receiving mode, while the operation board 8011 continues to transmit the packet.

As described above, despite the packets are transmitted from both the controller 8001 and the operation board 8011 in accordance with the standard of ISO11898, the operation board 8011 wins the arbitration; i.e., the data 7002 is transmitted, and the instruction from the operation board 8011 takes precedence. Accordingly, the controller 8001 no longer operates, and the automatic operation is quickly changed over to the manual operation.

When the two electric buses to which the nodes are connected are to be connected through optical fibers, as described above, optical bus-bridging devices having a mode shifting function are provided among the optical fibers and the electric buses. When the two buses are not driven simultaneously, the optical bus-bridging devices assume the standby mode to observe the modes of the buses of their own sides. When the driven mode of one bus or two buses is observed, the two bus-bridging devices separately assume the optical output mode for sending an optical output to the optical fiber and the bus drive mode for sending an electric output to the electric bus, avoiding the "deadlocked situation" or the "misjudged situation" that occurs when both of them assume the optical output mode. Accordingly, the modes in which the two electric buses are driven can be properly brought into agreement.

Moreover, the non-observation mode is passed through when the bus drive mode shifts to the standby mode, and a transient condition is not erroneously regarded to be that the bus is being driven, as a result of not observing the mode of the bus from the ON mode of the bus until it is stabilized in the OFF mode.

This makes it possible to constitute a system for substituting part of the network with optical fibers and, hence, to provide a network system featuring excellent resistance against noise in the field at a low cost. Moreover, the buses driven by a plurality of nodes are arbitrated in accordance with the standards of ISO11898, making it possible to bring the modes of the buses into agreement and to easily constitute a multi-master system.

Next, described below is another method of bringing the modes in which the buses are driven into agreement.

Figure 20:
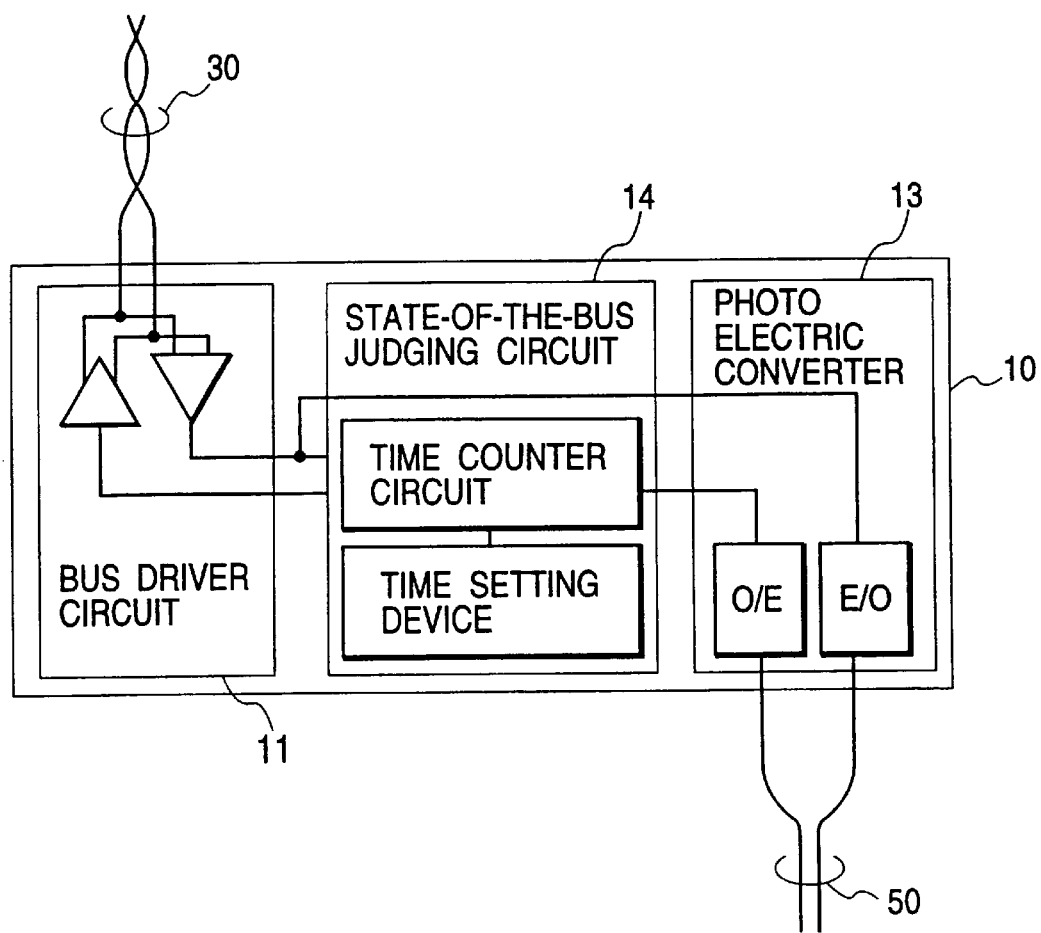
FIG. 20 is a diagram illustrating the constitution of another optical bus-bridging device.

FIG. 20 illustrates the constitution of an optical bus-bridging circuit. The communication system to which the optical bus-bridging device is adapted has been shown already in FIG. 1. The optical bus-bridging devices 10 have the same structure in the system A and in the system B, and are, hence, described without distinction depending upon the systems. As required, furthermore, a sign of the signal line is added in parenthesis to the end of the name of the signal.

The optical bus-bridging device 10 is constituted by the bus driver circuit 11, the state-of-the-bus judging circuit 14 and the photo-electric converter 13. The bus driver circuit 11 is connected to the bus 20 for transmitting signals transferred by the voltage, because transfer medium is a bus, hot voltage transferred by voltage, as described already, and sends a signal to the bus to change the mode of the bus 20 or to receive a signal from the bus 20. The photo-electric converter 13 is connected to the optical fiber 50 which transfers the light, and converts the transfer medium from the voltage to the light or from the light to the voltage. The state-of-the-bus judging circuit 14 receives a signal representing the mode of the bus 20 from the bus driver circuit 11 and a signal representing the mode of the optical fiber from the photo-electric converter 13, determines the mode which should be assumed by the bus 20, and sends to the bus driver circuit 11 a signal representing the determined mode that should be assumed by the bus 20.

The bus driver circuit in the optical bus-bridging device is the same as the one shown in FIGS. 3 and 4, and the photo-electric converter 13 is the same as the one shown in FIGS. 5 and 6.

Figure 21:
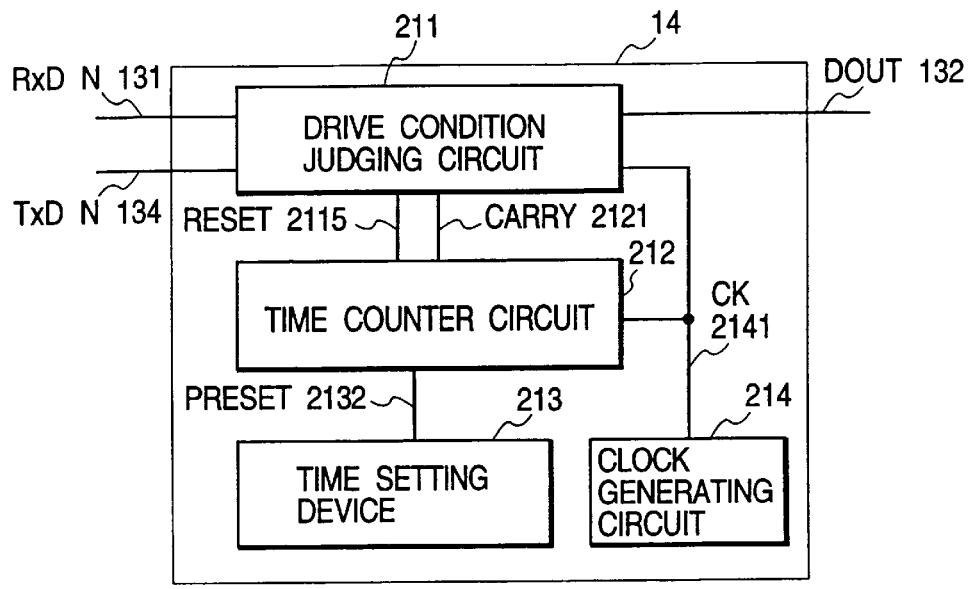
FIG. 21 is a diagram illustrating the constitution of a state-of-the-bus judging circuit.

FIG. 21 illustrates the internal constitution of the state-of-the-bus judging circuit 14. The state-of-the-bus judging circuit 14 is constituted by a drive condition judging circuit 211, a time counter circuit 212, a time setting circuit 213 and a clock generating circuit 214, receives a signal RxD_N outputted from the bus driver circuit 11 through a signal line 131, receives a signal DOUT outputted from the photo-electric converter 13 through a signal line 132, and outputs a signal TxD_N to the bus driver circuit 11 through a signal line 134. The driving condition judging circuit 211 outputs a counter reset signal RESET 2115 for resetting a counter in the time counter circuit 212, and the time counter circuit 212 outputs a counter carry signal CARRY 2121 to the drive condition judging circuit 211. The time setting circuit 213 outputs a preset count PRESET 2132 to the time counter circuit 212. The clock generating circuit 214 supplies a clock signal CK 2141 to the drive condition judging circuit 211 and to the time counter circuit 212.

The drive condition judging circuit 211 determines the mode which should be assumed by a bus 30 depending upon the signal RxD_N (131) representing a mode of the bus 30 to which it is connected and the signal DOUT (132) representing the mode of the bus 20 of the opposing side obtained through the optical fiber 50, and produces a signal TxD_N (134) for driving the bus 30. In the bus driver circuit 11 as shown in FIG. 3, furthermore, the output of the transmitter 1102 is inputted to the receiver 1101. Therefore, the mode of the bus 20 determined by the state-of-the-bus judging circuit 12 is directly outputted. Accordingly, the signal inputted to the optical bus-bridging device 10 of the opposing side from the optical bus-bridging device 10 having the same constitution through the optical fiber 50, is directly sent to the optical bus-bridging device 10 of its own side. Therefore, the optical bus-bridging devices 10 discriminate, by using the time counter circuit 212, whether the received signals are the signals sent by the optical bus-bridging devices 10 themselves by feedback.

Figure 29:
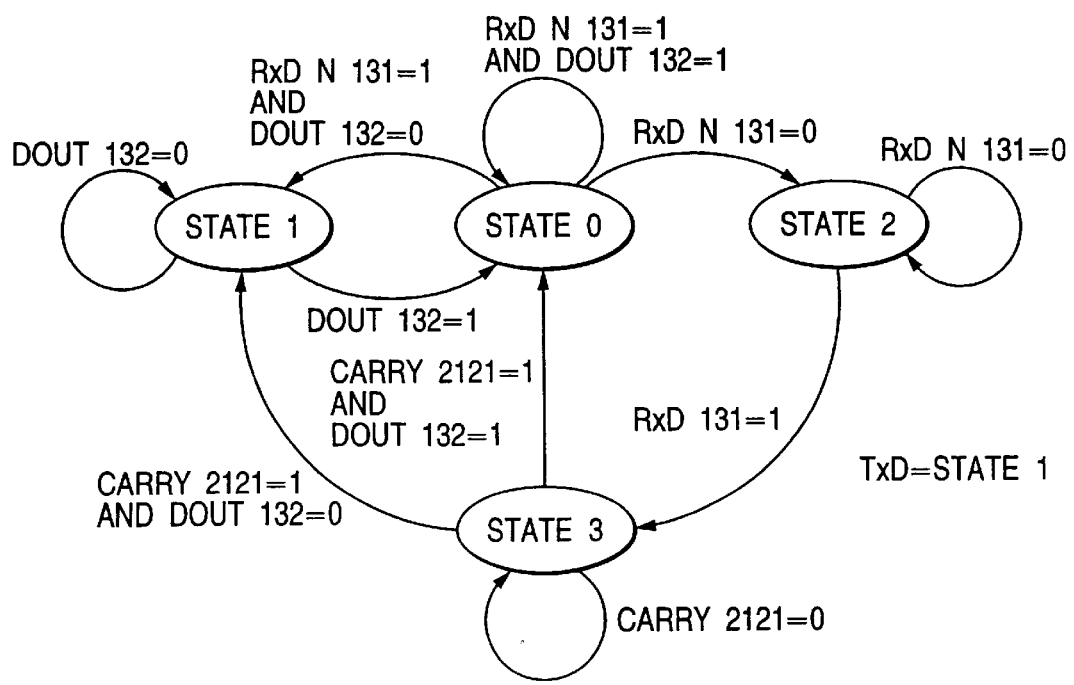
FIG. 29 is a diagram illustrating the state transition graph by the state-of-the-bus judging circuit.

FIG. 29 illustrates the state transition graph of the state-of-the-bus judging circuit 14. The state-of-the-bus judging circuit 14 assumes four modes 0 to 3. The input conditions include a signal RxD_N (131) outputted from the receiver 1101 in the bus driver circuit 11, a signal DOUT (132) sent from the optical fiber 50 and converted into an electric signal through the photo-electric converter 13, and a counter carry signal CARRY 2121 from the time counter circuit 212. A signal TxD_N (134) is outputted and is fed to the transmitter 102 in the bus driver circuit 11. The modes 0 to 3 are shifted from the one to the other depending upon the input conditions at the time when the clock signal CK2141 rises. The signal TxD_N (134) inputted to the transmitter 1102 becomes 0 in the mode 1 only. Described below is the shift of the mode. In the initial mode, i.e., when the buses A 20a and B 20b both remain turned OFF, both the signal RxD_N (131) output from the receiver 1101 and the signal DOUT (132) outputted from the photo-electric converter 13 assume 1, and the state-of-the-bus judging circuit 14 remains in the mode 0. When the bus A 20a is turned ON, the signal RxD_N (131) become 0, and the mode is shifted to the mode 2. In the mode 2, the signal TxD_N (134) continues to assume 1, and the mode 2 is maintained as far as the signal RxD_N (131) is 0. When the bus A 20a is turned OFF and the signal RxD_N (131) assumes 1, the mode is shifted to the mode 3. Here, the time counter circuit 212 operates. The mode 3 is maintained until a predetermined time elapses, i.e., so far as the counter carry signal CARRY 2121 is 0. This makes it possible to wait for until the mode of the bus B 20b is reflected. When the signal DOUT (132) is 1 at the time when the counter carry signal CARRY 2121 is 1, i.e., when the bus B 20b is turned OFF, the mode is shifted to the mode 0. When the signal DOUT (132) is 0 at the time when the counter carry signal CARRY 2121 is 1, i.e., when the bus B 20b is turned ON, the mode is shifted to the mode 1. The mode 2 is maintained while the signal DOUT (132) is 0, and the signal TxD_N (134) is set to 0 to drive the bus A 20a so as to assume the ON mode. When the signal DOUT (132) become 1, the mode is shifted to the mode 0. The mode is shifted to the mode 1 even when the signal RxD _N (131) is 1 in the mode 0 and the signal DOUT (132) become 0.

Figure 22:
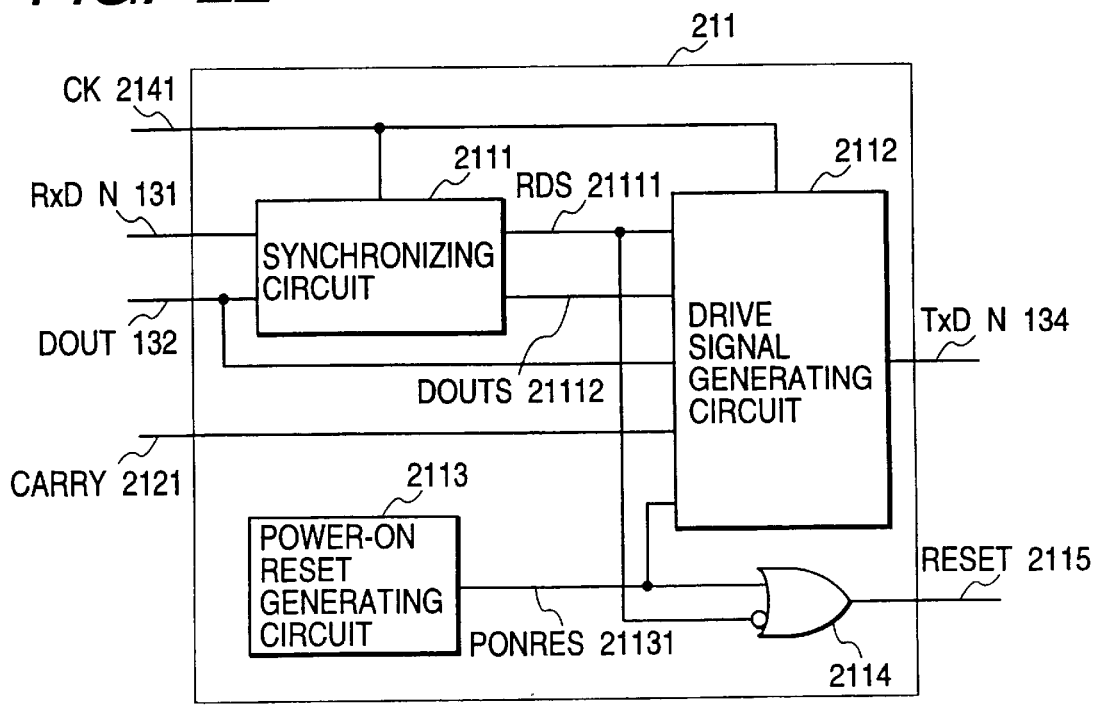
FIG. 22 is a diagram illustrating the constitution of a driving condition judging circuit.

FIG. 22 illustrates the constitution of the driving condition judging circuit 211. The driving condition judging circuit 211 is constituted by a synchronizing circuit 2111, a drive signal generating circuit 2112, a power-on reset generating circuit 2113 and an OR gate 2114. The synchronizing circuit 2111 receives the signal RxD_N (131) and the signal DOUT (132) and produces a synchronizing signal RDS (21111) and a signal DOUTS (21112). The drive signal generating circuit 2112 receives a synchronizing signal RDS (12111), a signal DOUTS (12112), a signal DOUT (132), a counter carry signal CARRY (2121) and a power-on reset signal PONRES (21131) from the power-on reset generating circuit 2113, and produces a signal TxD_N (134). The power-on reset generating circuit 2113 outputs the power-on reset signal PONRES (21131) for a predetermined period of time when the power source of the optical bus-bridging device 10 is turned on, and resets the latches in the drive signal generating circuit 2112 and in the time counter circuit 211. The OR gate 2114 forms a counter reset signal RESET (2115) by taking an inverted OR of the power-on reset signal PONRES (21131) and a synchronizing signal RDS (21111). That is, the counter reset signal RESET (2115) is outputted during the power-on resetting period and during the period in which synchronizing signal RDS (21111) is 1.

Figure 23:
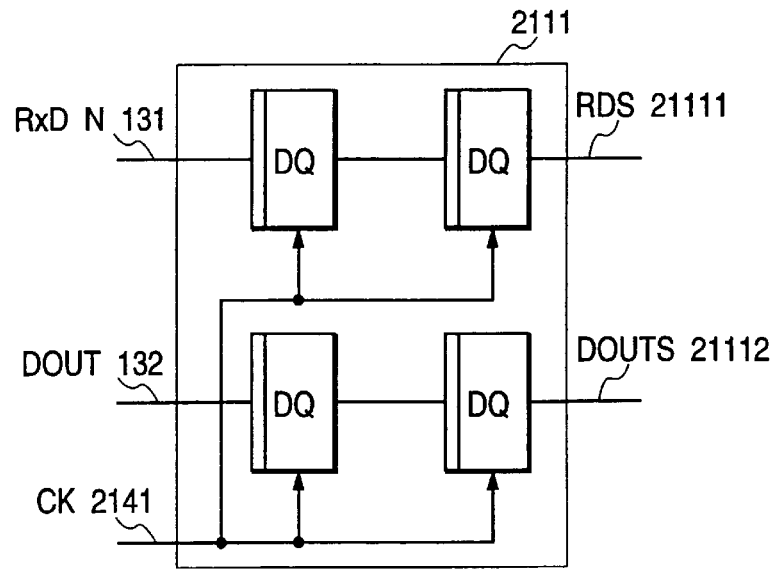
FIG. 23 is a diagram illustrating the constitution of a synchronizing circuit.

FIG. 23 is a diagram illustrating the constitution of the synchronizing circuit 2111. The synchronizing circuit 2111 is constituted by four latches that fetch the data in synchronism with the clock signal CK (2141). The signal RxD_N (131) and the signal DOUT (132) change in asynchronism with the clock signal CK (2141), and are passed through two stages of latches, respectively, in order to obtain a synchronizing signal RDS (21111) and a signal DOUTS (21112) that change in synchronism with the clock signal CK (2141).

Figure 24:
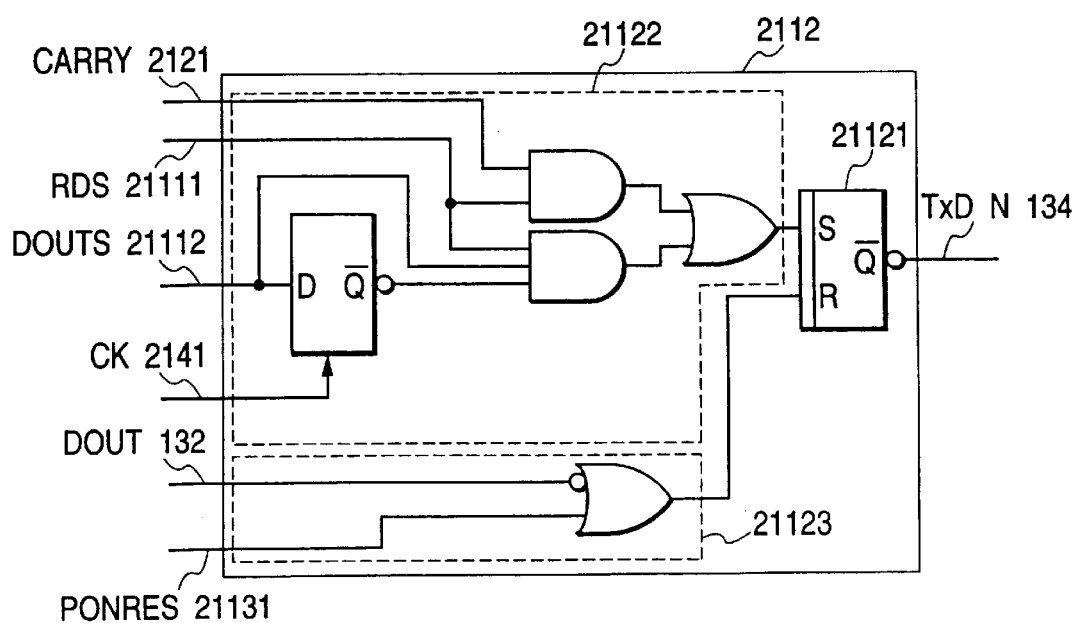
FIG. 24 is a diagram illustrating the constitution of a drive signal-generating circuit.

FIG. 24 illustrates the constitution of the drive signal generating circuit 2112. The drive signal generating circuit 2112 is constituted by a set/reset flip-flop 21121, a set condition circuit 21122 and an OR gate 21123, and the inverted output of the flip-flop 21121 is a signal TXD_N (134). The OR gate 21123 forms a flip-flop reset signal by taking an inverted OR of the power-on reset signal PONRES (21131) and the signal DOUT (132). That is, the flip-flop 21121 is reset and the signal TxD_N (134) becomes 1 during the power-on resetting period and during the period in which signal DOUT (132) is 1.

FIG. 25 is a diagram illustrating the operation of the set condition circuit 21122, and in which DOUTS (t) represents a value of the present signal DOUTS (21112) and DOUTS (t-1) represents a value of the signal DOUTS (21112) of one clock before. That is, the flip-flop (21121) is set and the signal TxD_N (134) becomes 0 when the value of the signal DOUTS (21112) of one clock before is 0, the value of the present signal DOUTS (21112) is 1 and the value of the synchronizing signal RDS (21111) is 1, or when the value of the counter carry signal CARRY (2121) is 1 and the value of the synchronizing signal RDS (21111) is 1.

Figure 27:
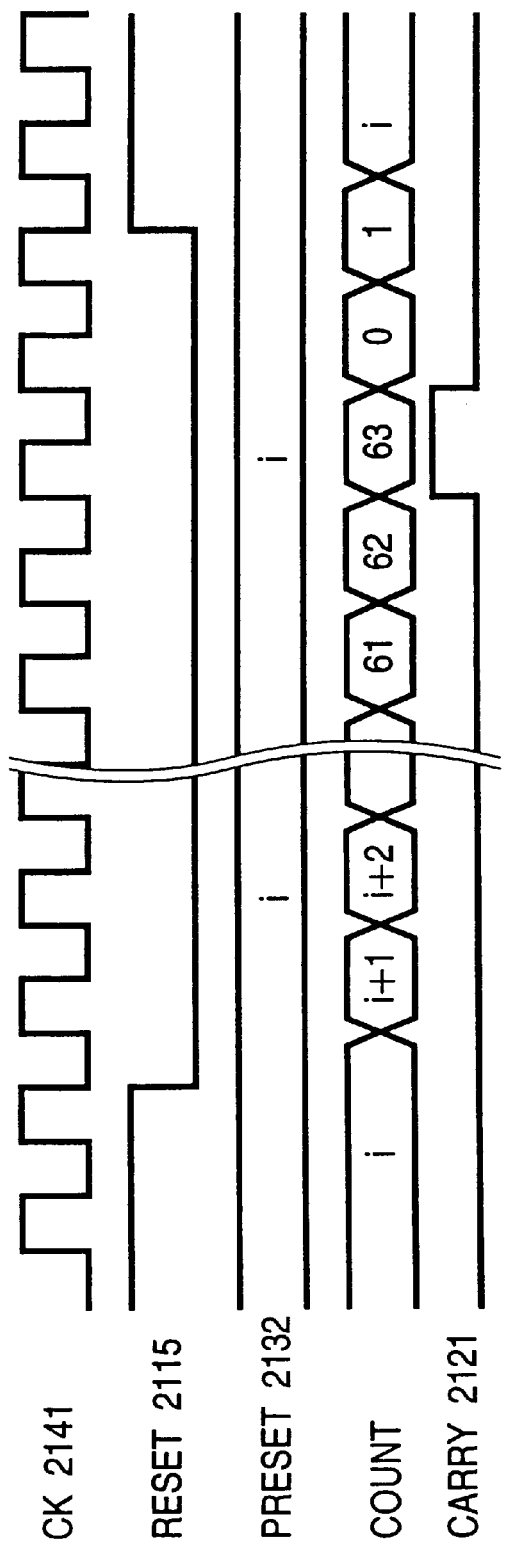
FIG. 27 is a diagram of a time chart illustrating the operation of the time counter circuit.

FIG. 26 is a diagram illustrating the operation of the time counter circuit 212. The time counter circuit 212 includes a counter circuit which effects the count-up in synchronism with the rise of the clock when the condition holds true. The counter circuit, however, is a generally employed one and is not described here. In the present invention, the counter circuit comprises a 6-bit register and counts values from 0 up to 63. When the reset input RESET (2115) is 1, the counter assumes a value i (i=0 to 62) of preset count PRESET (2132) as the clock signal CK (2141) rises, and the value of the counter is incremented for every rise of the clock signal CK (2141) so far as RESET (2115) is 0. When the value of the counter is 63, the counter carry signal CARRY (2121) becomes 1. A series of the operations is shown in a time chart of FIG. 27.

Figure 28:
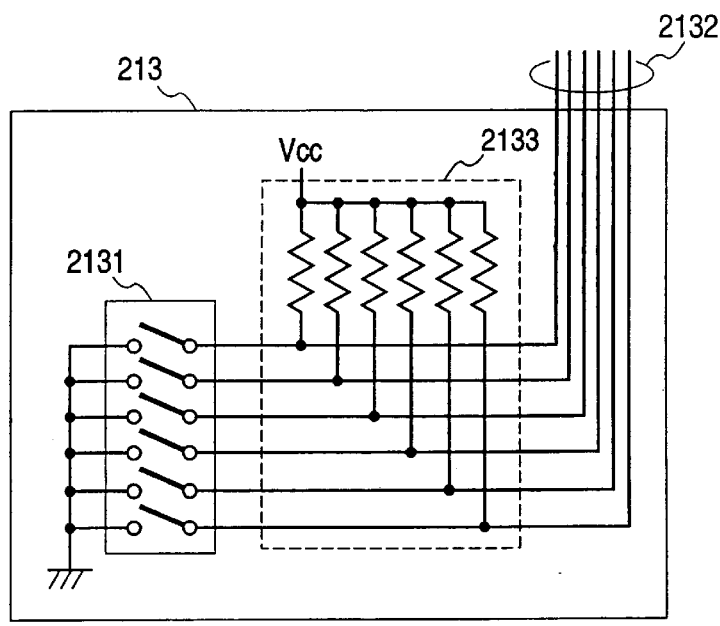
FIG. 28 is a diagram illustrating the constitution of a time-setting circuit.

FIG. 28 illustrates the constitution of the time setting circuit 213. The time setting circuit 213 is constituted by a 6-bit setting switch 2131 and a pull-up resistor 2133, and outputs 0 for each of the bits when the switch is closed and outputs 1 when the switch is opened.

Next, described below is the operation of the case when the optical bus-bridging device shown in FIG. 20 is adapted to the communication system of FIG. 1.

First, concretely described below is how to obtain the right for transmission when a plurality of nodes are to transmit messages. The bus A 20a is turned ON when the node 30a turns the bus A 20a OFF (without driving it) based on a first bit that constitutes an identifier to transmit a message and when the node 30b drives the bus to turn it ON based on a first bit which constitutes an identifier to transmit a message. Next, the node 30a that has attempted to turn the bus A 20a OFF monitors the mode of the bus A 20a, detects the mode of the bus A 20a that is turned ON, i.e., detects the fact that it could not turn the bus A 20a OFF. Similarly, the node 30b monitors the mode of the bus A and detects the fact that it could turn the bus A 20a ON. This is done for every bit constituting the identifier, and either the node 30a or the node 30b obtains the right for transmission. This method has been described in detail in a literature quoted in the prior art. The operation of the node from outputting a bit which is in an identifier up to the detection of the mode of the bus is executed within a time of transmitting a bit. In the operation of the system described below, a point at which the mode of the bus is detected by the node is called sampling point.

Figure 31:
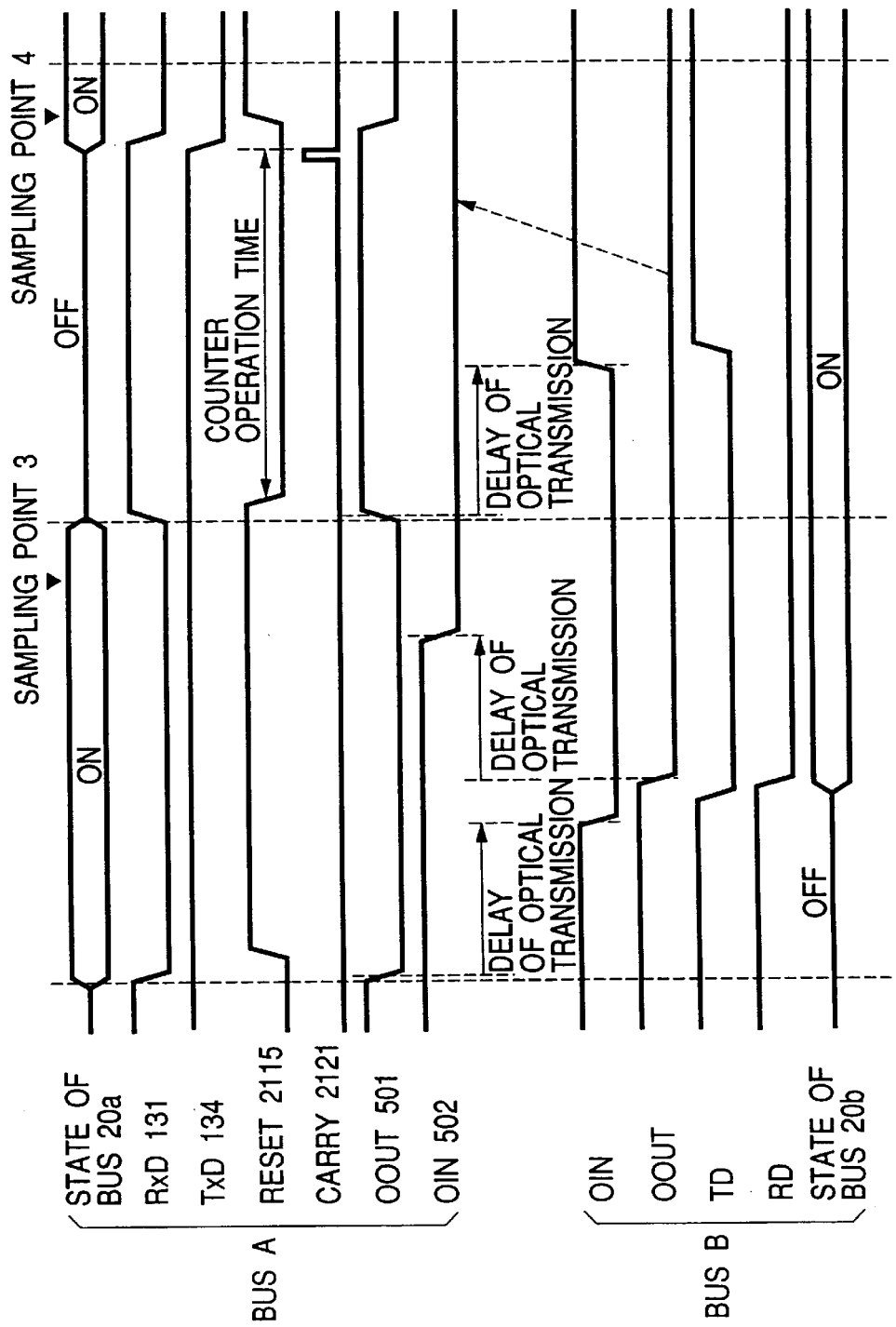
FIG. 31 is a time chart illustrating the operation of the bus-bridging device.

FIG. 31 illustrates a mode where the node (30a or 30b) connected to the bus A 20a drives the bus A 20a so as to be turned ON in a given transfer cycle but does not drive the bus in the next transfer cycle, and the nodes (30c and 30d) connected to the bus B 20b do not drive the bus B 20b during this period.

When the node 30a turns the bus A 20a ON, the signal RxD_N (131) outputted from the receiver 1101 in the bus driver circuit 11a of the optical bus-bridging device 10a changes from the logic 1 to the logic 0. Through the electric-photo conversion unit E/O 1302 in the photo-electric converter 13, the signal RxD_N (131) is transmitted, as a level of a signal OOUT (501), to the optical bus-bridging device 10b through the optical fiber 50 after a delay time due to optical transmission. The signal OIN 502 inputted to the photo-electric converter 13b of the optical bus-bridging device 10b changes from 1 to 0, and a signal DOUT (132) converted through the photo-electric conversion unit O/E 1301 is outputted. The state-of-the-bus judging circuit 14b in the optical bus-bridging device 10b sends a signal TxD_N (134) of the logic 0 to the transmitter 1102 in the bus driver 11b since the signal OIN (502) has changed to the logic 0 while the bus of its own side is turned OFF, i.e., while the bus B 20b is in the OFF mode, and drives the bus B 20b to assume the ON mode. Upon receiving the logic mode of the transmitter 1102, on the other hand, the receiver 1101 in the optical bus-bridging device 10b sends the signal RxD_N (131) of the logic 0 to the optical fiber 50 through the photo-electric converter 13b so that it is transmitted to the optical bus-bridging circuit 10a. However, since the bus A 20a has been turned ON already, the state-of-the-bus judging circuit 14a in the bus-bridging circuit 10a does not change the signal TXD_N (134) inputted to the transmitter 1102 of the bus driver circuit. The nodes 30a and 30b fetch the mode of the bus A 20a at the end of the bit transmission time, i.e., at the sampling point 1, and detect the ON mode of the bus.

When the nodes 30a and 30b do not drive the bus A 20a in the next bit transfer cycle, the signal RxD_N (131) outputted from the receiver 1101 of the bus driver circuit 11a in the optical bus-bridging device 10a changes from the logic 0 to the logic 1. Through the electric-photo conversion unit E/O 1302 of the photo-electric converter 13a in the optical bus-bridging device 10a, the signal RxD_N (131) is transmitted, as a level of the signal OOUT (501), to the optical bus-bridging device 10b through the optical fiber 50, and the signal DOUT (132) outputted from the photo-electric conversion unit O/E 131 of the photo-electric converter 13b in the optical bus-bridging circuit 10b changes from the logic 0 to the logic 1. Then, the counter reset signal RESET (2115) in the optical bus-bridging device 10b changes from the logic 1 to the logic 0, and the time counter circuit 212 starts the counting operation. The state-of-the-bus judging circuit 14b in the optical bus-bridging device 10b outputs the signal TxD_N (134) of the logic 1 to the transmitter 1102 in the bus driver circuit 11b since the signal DOUT (132) is outputted while it is driving the bus B 20b, and no longer drives the bus B 20b. Then, the mode of the bus B 20b changes into the OFF mode. The OFF mode of the bus B 20b is fed back to the optical bus-bridging device 10a through the bus driver circuit 11b of the optical bus-bridging device 10b, the photo-electric converter 13b and the optical fiber 50. The mode of the bus B 20b that is fed back is judged depending upon the fact that the counter carry signal CARRY (2121) from the time counter circuit 212 in the optical bus-bridging device 10a has changed into the logic 1. In this example, the bus A 20a has been turned OFF already, and the state-of-the-bus judging circuit 14a in the optical bus-bridging device 10a does not change the input signal TxD_N (134). The nodes 30a and 30b fetch the mode of the bus A 20a at the end of the time for transferring the bit, i.e., at a sampling point 2, and detects the OFF mode of the bus.

FIG. 32 illustrates a mode where the node (30a or 30b) connected to the bus A 20a drives the bus A 20a to assume the ON mode in a given transfer cycle but does not drive the bus in the next transfer cycle, and the nodes (30c and 30d) connected to the bus B 20b do not drive the bus B 20b in the first transfer cycle but either one of the nodes drives the bus B 20b in the next transfer cycle.

Figure 30:
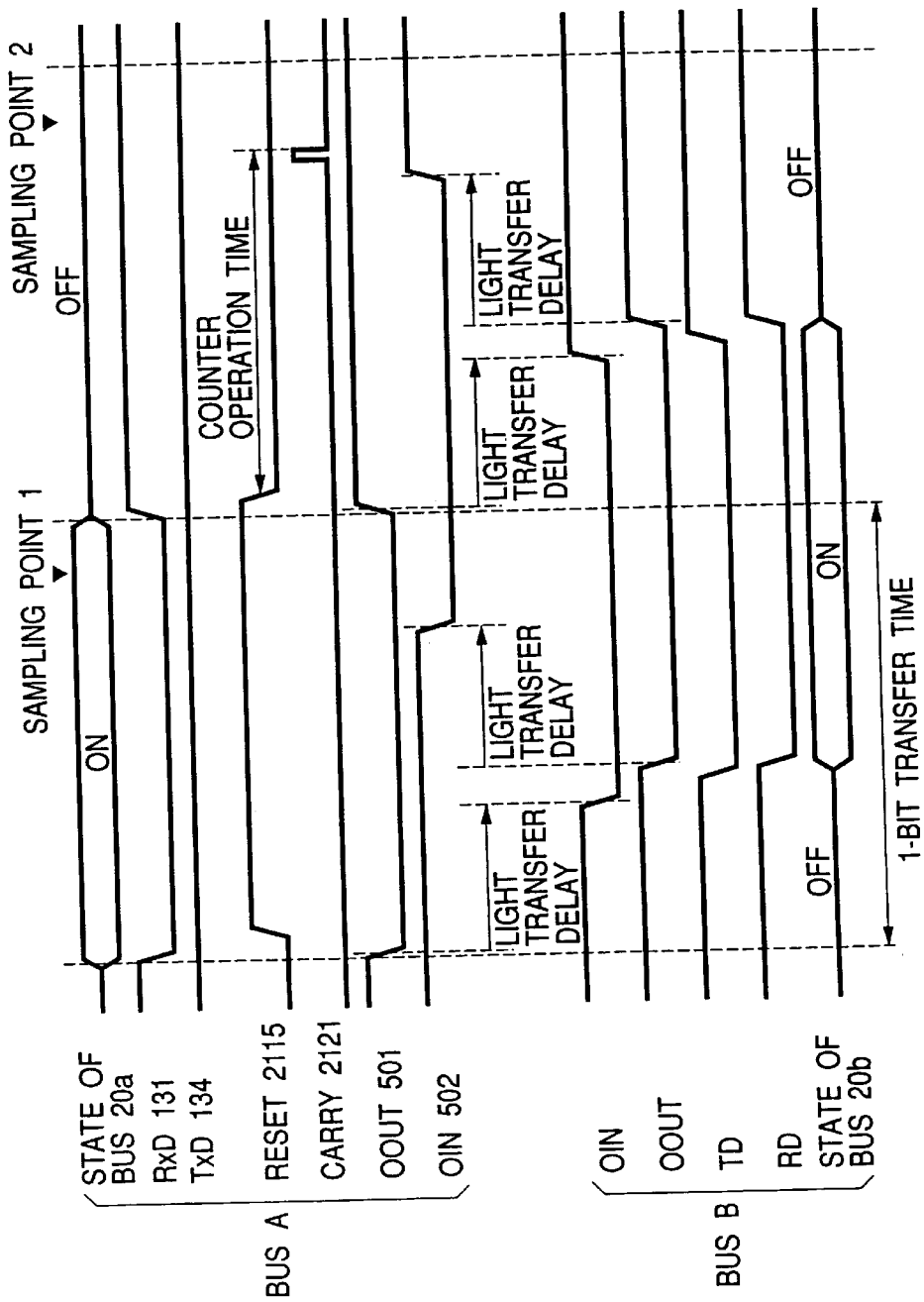
FIG. 30 is a time chart illustrating the operation of the bus-bridging device.

When the bus A 20a is turned ON, the signal RxD_N (131) of the receiver 1101 of the bus driver circuit 11a in the optical bus-bridging device 10a changes from the logic 1 to the logic 0. This signal is then transmitted, as a level of the signal OOUT (501) of the photo-electric converter 13a in the bus driver circuit 11a, to the optical bus-bridging device 10b through the optical fiber 50 after a delay time of optical transmission. The photo-electric converter 13b in the optical bus-bridging device 10b receives the signal OIN (502) which has changed from the logic 1 to the logic 0, and a signal DOUT (132) of the logic 0 is outputted from the photo-electric converter 1301. The state-of-the-bus judging circuit 14b in the optical bus-bridging device 10b outputs a signal TxD_N of the logic 0 to the bus driver circuit 11b since the signal DOUT (132) has changed into the logic 0 while the bus of its own side is in the OFF mode, i.e., while the bus B 20b is in the OFF mode, and drives the bus B 20b to assume the ON mode. The ON mode of the bus B 20b is fed back to the optical bus-bridging device 10a through the bus driver circuit 11a of the optical bus-bridging device 10a, the photo-electric converter 13b and the optical fiber 50. At this moment, the bus A 20b has been turned ON already and, hence, the state-of-the-bus judging circuit 14a in the optical bus-bridging device 10a does not change the signal TxD_N (125) of the bus driver circuit 11a. The nodes 30a and 30b fetch the mode of the bus A 20a at the end of the time for transferring the bit, i.e., at a sampling point 3, and detects the ON mode of the bus. The operation of the first transfer cycle is quite the same as that of FIG. 30.

When the nodes 30a and 30b do not drive the bus A 20a in the next transfer cycle, the signal RxD_N (131) of the bus driver circuit 11a in the optical bus-bridging device 10a changes from the logic 0 to the logic 1. This signal is transferred, as a level of OOUT (501) of the photo-electric converter in the optical bus-bridging device 10a, to the optical bus-bridging device 10b through the optical fiber 50, and the photo-electric converter 13b in the optical bus-bridging device 10b outputs a signal OIN (502) that has changed from the logic 0 to the logic 1 as a signal DOUT (132) of the photo-electric conversion unit O/E 1301. When the signal RxD_N (131) of the bus driver circuit 11a in the optical bus-bridging device 10a changes from the logic 0 to the logic 1 due to the bus A 20a that has changed into the OFF mode, the counter reset signal RESET (2115) of the drive condition judging circuit 211 in the optical bus-bridging device 10a changes from the logic 1 to the logic 0, and the time counter circuit 212 starts the counting operation.

Upon receiving a signal DOUT (132) from the photo-electric converter 13a due to a signal transmitted from the optical bus-bridging device 10a, the state-of-the-bus judging circuit 14a in the optical bus-bridging device 10a changes the logic of the signal TxD_N inputted to the bus driver circuit 11b to 1 since the signal DOUT (132) is assuming 1 while it is driving the bus B 20b, and no longer drives the bus B 20b. In this example, however, the nodes 30c or 30d is already driving the bus B 20b and, hence, the bus B 20b remains in the ON mode. Therefore, the signal RxD_N (131) of the logic 0 is continuously outputted from the bus driver circuit 11b of the optical bus-bridging device 10b. Hence, the signal OOUT (501) which is outputted from the optical bus-bridging device 10b to the optical fiber 50 maintains the logic 0. In the optical bus-bridging device 10a, on the other hand, the counter carry signal CARRY (2121) of the time counter circuit (212) assumes the logic 1 after the passage of a predetermined period of time, and the state-of-the-bus judging circuit 14a of the optical bus-bridging device 10a that has received this signal sends an input signal TxD_N (134) of the logic 0 to the bus driver circuit 11a to drive the bus A 20a so as to assume the ON mode. Thereafter, the nodes 30a and 30b fetch the mode of the bus A 20a at a sampling point 4 and detect the ON mode of the bus, i.e., detect that the mode of the bus B 20b is properly reflected by the bus A 20a.

Next, described below is how to set the time setting circuit (213) in the optical bus-bridging devices 10a and 10b. It is now presumed that the optical fiber 50 has a length of 500 m, the propagation speed is 5 nsec/m, the oscillation frequency of the clock generating circuit 214 is 10 MHz, and the sum of passage times of the optical bus-bridging devices 10a, 10b, i.e., the delay time of the bus driver circuits 11a, 11b, the delay time of the state-of-the-bus judging circuits 14a, 14b, and the delay times of the photo-electric conversion circuits 13a, 13b is 500 nsec. In this case, the time that should be counted by the time counter circuit 212 is the sum of the round-trip transfer delay through the optical fiber and the passage time through the bus-bridging devices, i.e., 500×5×2+500 nsec=5.5 μsec. The counter is capable of counting up to 6 bits, i.e., up to 63, and is counted up every time after 100 nsec. Therefore, if PRESET (2132) has been initially set to 9, the counter carry signal CARRY (2121) assumes the logic 1 after 5.5 μsec have passed from when RESET (2115) has assumed the logic 0. When the optical fiber 50 has a length of 250 m, then, the time is 3.0 μsec, and the initial setting will be 34. It is thus allowed to set a value in proportion to the length of the optical fiber 50, and correct transfer is accomplished even when the optical fibers have dissimilar lengths.

When the lengths of the buses A 20a and B 20b, i.e., the electric transfer times, are too long to be neglected with respect to the length of the optical fiber 50 or the optical transfer time, the electric transfer time must be added to a value set by the time setting device 213. It is now presumed that the buses A 20a and B 20b have a length of 100 m, respectively, the propagation speed is 5 nsec/m, the optical fiber 50 has a length of 300 m, the propagation speed is 5 nsec/m, the oscillation frequency of the clock generating device 214 is 10 MHz, and the sum of the passage times of the optical bus-bridging devices 10a and 10b, i.e., delay times of the bus driver circuits 11a, 11b, the delay times of the state-of-the-bus judging circuits 14a, 14b, and the delay times of the photo-electric conversion circuits 13a, 13b is 500 nsec. In this case, the time to be counted by the time counter circuit 212 is the sum of the round-trip transfer delay of the optical fiber, passage time of the bus-bridging devices and the round-trip transfer time of either the bus A or the bus B, i.e., 300×5×2+500+100×5×2 nsec=4.5 μsec, and the initial setting will be 19. Thus, a value proportional to the length of the electric bus is added to a value proportional to the length of the optical fiber to properly transfer the signals even when the electric bus is long.

By using the optical bus-bridging device of the present invention as described above, it is allowed to minimize the time for transferring a bit, and the transfer time of the data processing system can be shortened.

The above-mentioned embodiment has dealt with the case where the message has an identifier and the degree of priority is determined by the identifier. The invention, however, is in no way limited thereto only, and the transfer time of the whole system can be similarly shortened even when the data are to be simply transferred finding a wide range of applications.

As described above, the mode of the bus of the opposing side can be properly judged by the state-of-the-bus judging circuit using a time counter circuit, and the same mode of the buses can be maintained on both sides of the bus-bridging devices within a time of transferring a bit.

Even when the buses are simultaneously driven by a plurality of nodes, there can be realized a data processing system capable of transferring data at high speed using optical fibers.

What is claimed is:

1. A data transferring system comprising:
   a first bus transferring a voltage level;
   a second bus transferring a voltage level;
   a plurality of devices connected to said first bus or said second bus for detecting the mode of the bus to determine whether a transmission can be effected or not, and for transmitting and receiving messages;
   a first bus-bridging circuit connected between said first bus and a third bus in order to connect said first bus to said second bus through said third bus transferring light; and
   a second bus-bridging circuit connected between said second bus and said third bus;
   wherein said first and second bus-bridging circuits have a function for detecting whether a signal input from the third bus is a signal output from said first and second bus-bridging circuits themselves or not.

2. A data transferring system according to claim 1,
   wherein when the mode of said third bus does not change within a predetermined period of time after a signal is output to said third bus from said first and second bus-bridging circuits, said first and second bus bridging circuits change the mode of the first bus or the second bus connected to said first and second bus-bridging circuits.

3. A data transferring system according to claim 2,
   wherein said predetermined period of time varies in proportion to a signal transmission delay time in said third bus.

4. A bus bridging circuit comprising:
   a bus driver circuit connected to a first bus that transfers a voltage level and exchanges signals relative to said first bus;
   a conversion circuit, connected to a second bus transferring light, that outputs optical signals to said second bus; and
   a state-of-the-bus judging circuit, which receives a signal representing the mode of said first bus sent from said bus driver circuit and a signal representing the mode of said second bus sent from said conversion circuit, determines the next modes of said first bus and said second bus based upon a change in the signal representing the mode of said first bus and upon a change in the mode of said second bus, and sends said bus driver circuit an output signal indicating whether said bus driver circuit drives said first bus or not and sends said conversion circuit an output signal indicating whether said conversion circuit outputs optical signals to said second bus or not.

5. A bus bridging circuit according to claim 4,
   wherein said state-of-the-bus judging circuit has a time counter, and determines the next modes of said first bus and said second bus based upon a change in the signal representing the mode of said first bus, a change in the mode of said second bus and a signal from said time counter.

* * * * *